United States Patent
Kallas et al.

(10) Patent No.: US 12,548,030 B2
(45) Date of Patent: Feb. 10, 2026

(54) SYSTEMS AND METHODS FOR IMPLEMENTING A NODAL DATA STRUCTURE FOR FRAUD RING DETECTION

(71) Applicant: U.S. Bancorp, National Association, Minneapolis, MN (US)

(72) Inventors: Christopher Kallas, Grafton, WI (US); Wentao Lu, Minnetonka, MN (US); Xiaoqiao Wei, Woodbury, MN (US); Ding Ma, Thousand Oaks, CA (US)

(73) Assignee: U.S. Bancorp, National Association, Minneapolis, MN (US)

( * ) Notice: Subject to any disclaimer, the term of this patent is extended or adjusted under 35 U.S.C. 154(b) by 81 days.

(21) Appl. No.: 18/583,649

(22) Filed: Feb. 21, 2024

(65) Prior Publication Data

US 2025/0265589 A1 Aug. 21, 2025

(51) Int. Cl.
*G06Q 20/40* (2012.01)
*G06Q 20/42* (2012.01)

(52) U.S. Cl.
CPC ....... *G06Q 20/4016* (2013.01); *G06Q 20/425* (2013.01)

(58) Field of Classification Search
CPC .......................... G06Q 20/4016; G06Q 20/425
See application file for complete search history.

(56) References Cited

U.S. PATENT DOCUMENTS

| | | | | |
|---|---|---|---|---|
| 9,087,088 B1 * | 7/2015 | Bose | ...................... | G06F 16/288 |
| 11,061,874 B1 * | 7/2021 | Funk | ................... | G06F 16/2468 |
| 11,601,509 B1 * | 3/2023 | Lofgren | ................ | G06Q 50/01 |
| 2010/0169137 A1 * | 7/2010 | Jastrebski | .............. | G06Q 20/04 |
| | | | | 705/30 |
| 2013/0305356 A1 * | 11/2013 | Cohen-Ganor | ..... | H04L 63/1416 |
| | | | | 726/22 |
| 2020/0167787 A1 * | 5/2020 | Kursun | ................. | H04L 67/306 |
| 2022/0343329 A1 * | 10/2022 | Wang | ..................... | G06N 20/00 |

FOREIGN PATENT DOCUMENTS

| | | | | | |
|---|---|---|---|---|---|
| CN | 109584041 A | * | 4/2019 | ............. | G06Q 40/03 |
| CN | 113449150 A | * | 9/2021 | ............. | G06Q 50/26 |
| CN | 114723571 A | * | 7/2022 | ......... | G06Q 30/0201 |
| WO | WO-2023102157 A1 | * | 6/2023 | ......... | G06Q 20/4016 |

OTHER PUBLICATIONS

"Learning from metadata: A fuzzy token matching based configuration file discovery approach", Han Wang, IEEE 8th International Conference on Cloud Computing, 2015 (Year: 2015).*

* cited by examiner

*Primary Examiner* — Duan Zhang
(74) *Attorney, Agent, or Firm* — FOLEY & LARDNER LLP

(57) ABSTRACT

A system includes one or more processors to generate a node graph; determine a first node of the node graph comprises a fraudulent flag indicating a first entity of the first node facilitated a fraudulent transaction; responsive to the determination, identify a set of nodes of the node graph responsive to each node of the set of nodes having a direct transaction edge connection with the first node within the node graph or an indirect transaction edge connection with the first node via at least one node directly connected with the first node; generate a fraudulent flag in a subset of the set of nodes responsive to determining each node in the subset satisfies a matching policy; and generate a record identifying the first node and each node of the subset of nodes.

20 Claims, 12 Drawing Sheets

SYSTEMS AND METHODS FOR IMPLEMENTING A NODAL DATA STRUCTURE FOR FRAUD RING DETECTION

BACKGROUND

In recent years, the prevalence of sophisticated fraud schemes, particularly those involving fraud rings, has significantly increased. A fraud ring involves multiple entities or individuals working collaboratively to commit fraud, often in complex patterns that are difficult to detect with traditional methods. These schemes can span various domains, including insurance fraud, credit card fraud, banking fraud, e-commerce fraud, and more.

BRIEF DESCRIPTION OF THE DRAWINGS

FIG. 12 illustrates an example machine learning framework that techniques described herein may benefit from.

DETAILED DESCRIPTION

Figure 1:
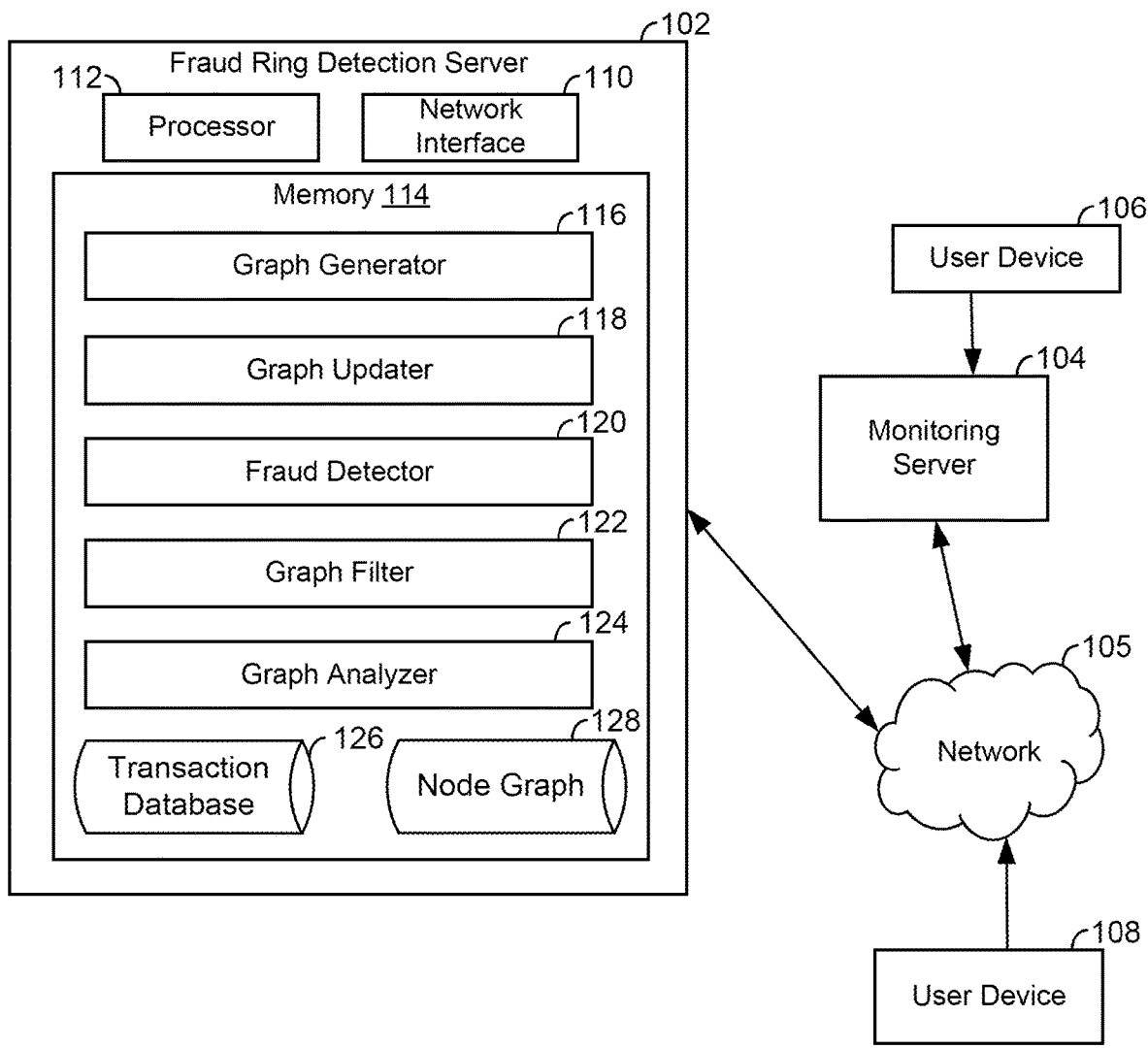
FIG. 1 illustrates an example system for fraud ring detection using a nodal data structure, in accordance with an implementation.

As mentioned above, fraud rings have become more and more commonplace in different environments. Such fraud rings are becoming more elaborate and complex, and thus are becoming more difficult to detect via conventional technical means. Some attempts to detect fraud rings may involve data mining and analysis, which can involve examining large sets of data to identify patterns and anomalies that suggest fraudulent activities using predictive modeling or data visualization. Some attempts can involve using machine learning and artificial intelligence, which can involve machine learning models (e.g., neural networks) processing the large sets of data to generate likelihoods of whether different accounts or profiles are associated with fraud rings.

Conventional techniques for detecting fraud rings may have substantial technical drawbacks. The following are a few examples of such drawbacks: (i) detecting fraud rings can involve processing vast amounts of personally identifiable information (PII) to scrutinize different transactions or accounts for potential links to fraudulent activities, which can require significant computational resources; (ii) integrating and managing data from disparate sources is a complex task, different systems and platforms often store PII in varied formats, which can add to the processing burden when attempting to aggregate and analyze this information; (iii) the sheer number of variations in PII (e.g., slight name changes, different addresses) used by fraud rings creates a vast search space, resulting in extensive processing power to match, link, and analyze these variations; (iv) the need for real-time or near real-time analysis to promptly detect and respond to fraudulent activities further intensifies the processing demands; (v) employing advanced analytical techniques, such as machine learning algorithms, to detect patterns indicative of fraud rings is computationally intensive and can require substantial processing power to train models and make accurate predictions; (vi) ensuring the security and privacy of PII during the fraud detection process can involve encryption and other security measures, which can add to the computational load; and (vii) accurately distinguishing between legitimate activities and those of fraud rings, while minimizing false positives, can require complex algorithms and additional processing resources. Each of these technical issues can result in companies or organizations using server farms or cluster computing to detect fraud rings and/or potential fraud rings for monitoring.

A computer implementing the systems and methods described herein can overcome the aforementioned technical deficiencies of detecting fraud rings through a technical means. The computer can do so, for example, by generating and using a nodal data structure based on transaction data of different accounts and then using transaction edges between the nodes of the nodal data structure to determine which nodes to compare with each other to detect fraud rings. For example, the computer can obtain and store transaction data of transactions performed by different accounts over time. The computer can use the stored transaction data to generate a nodal data structure (e.g., a node graph) by generating nodes for the individual accounts and linking the nodes with transaction edges based on transactions performed between the different accounts. The computer can determine one (or multiple) of the accounts associated with a node in the nodal data structure that facilitated a fraudulent transaction or is otherwise suspicious of fraud. The computer can use transaction edges connected with the suspicious node (or suspicious nodes) to identify potentially fraudulent nodes of a fraud ring. The computer can compare the data (e.g., PII data) of the fraudulent node with the potentially fraudulent nodes using a set of rules of a matching policy. Based on the comparison, the computer can identify potentially fraudulent nodes with matching data with the fraudulent node as fraudulent nodes or otherwise as nodes to monitor as potentially being associated with a fraud ring.

In some cases, to further reduce the comparisons between accounts and reduce the computing resources that are required for fraud ring detection, the computer can collapse nodes of the nodal data structure together. The computer may do so by identifying nodes that correspond to accounts of the same entity or customer. For example, when generating the nodal data structure or after generating the nodal data structure, the computer can identify the data within the individual nodes of the nodal data structure. The computer can identify pairs of individual nodes that have matching customer numbers with each other or that otherwise correspond to a common entity (e.g., individual or organization). The computer can collapse or combine such pairs of nodes into consolidated nodes that include data of the accounts represented by the respective collapsed nodes. If one of the accounts of a consolidated node is determined to have facilitated a fraudulent transaction, the computer can automatically determine the other account is a fraudulent account or a potentially fraudulent account for monitoring purposes. The computer can use transaction edges between the consolidated node and other nodes within the graph to determine other nodes of a fraud ring or that are potentially fraudulent. By consolidating nodes in this manner for fraud detection, the computer can reduce the number of edges within the node graph for fraud detection.

In one test case, using a testing dataset of 18.8 million transaction edges between nodes, the consolidation process cut down the number of edges to 9.7 million transaction edges, which is a 48% data reduction in the node graph. This reduction in edges substantially reduced storage requirements of storing the node graph in memory and reduced the processing resources for relevant processing for fraud detection and monitoring using the nodal data structure.

Advantageously, using the above-described method of fraud ring detection can substantially reduce the processing and memory storage costs of detecting accounts to monitor. For example, there may be billions of data entries to use to determine accounts that may be associated with a fraud ring. Consolidating such data entries into a nodal data structure with transaction edges between nodes and then using the transaction edges to identify potentially fraudulent accounts can substantially reduce the processing resources that are required to identify fraud rings while still accurately doing so. Further consolidating the nodal data structure by collapsing nodes associated with common entities can further reduce the computational resources for detecting fraud rings.

For example, FIG. 1 illustrates an example system 100 for fraud ring detection using a nodal data structure, in accordance with an implementation. In brief overview, the system 100 can include a fraud ring detection server 102, a monitoring server 104, a user device 106, and a user device 108. The fraud ring detection server 102, the monitoring server 104, the user device 106, and/or the user device 108 can each include one or more aspects described elsewhere herein, such as in reference to the computing environment 1100 of FIG. 11. The fraud ring detection server 102 can be configured to generate a nodal data structure (e.g., a node graph) that contains nodes representing different accounts and transaction edges between the nodes that represent transactions between the accounts represented by the nodes. The fraud ring detection server 102 can determine when an account represented by a node is fraudulent or potentially fraudulent and then use transaction edges linking the node with other nodes within the nodal data structure to identify a subset of nodes that may be a part of a fraud ring with the account represented by the node. The fraud ring detection server 102 can apply a matching policy to compare field-value pairs of the node with the subset of nodes to identify nodes within the subset that are fraudulent or potentially fraudulent. The fraud ring detection server 102 can generate and/or transmit a record indicating the accounts of the node and the potentially fraudulent nodes of the subset to the monitoring server 104 to indicate nodes that are fraudulent require further monitoring as being a part of a fraud ring. In this way, the fraud ring detection server 102 can use a nodal data structure to automatically identify accounts that may be a part of a fraud ring in a faster and less resource-intensive manner than conventional methods of fraud ring detection. The system 100 may include more, fewer, or different components than shown in FIG. 1.

The fraud ring detection server 102, the monitoring server 104, the user device 106, and the user device 108 can include or execute on one or more processors or computing devices and/or communicate via the network 105. The network 105 can include computer networks such as the Internet, local, wide, metro, or other area networks, intranets, satellite networks, and other communication networks, such as voice or data mobile telephone networks. The network 105 can be used to access information resources such as web pages, websites, domain names, or uniform resource locators that can be presented, output, rendered, or displayed on at least one computing device (e.g., the fraud ring detection server 102, the monitoring server 104, the user device 106, and/or the user device 108), such as a laptop, desktop, tablet, personal digital assistant, smartphone, portable computer, or speaker.

The fraud ring detection server 102, the monitoring server 104, the user device 106, and/or the user device 108 can include (e.g., each include) or utilize at least one processing unit or other logic devices such as a programmable logic array engine or a module configured to communicate with one another or other resources or databases. As described herein, computers can be described as computers, computing devices, user devices, or client devices. The fraud ring detection server 102, the monitoring server 104, the user device 106, and/or the user device 108 may each contain a processor and a memory. The components of the fraud ring detection server 102, the monitoring server 104, the user device 106, and/or the user device 108 can be separate components or a single component. The system 100 and its components can include hardware elements, such as one or more processors, logic devices, or circuits.

The monitoring server 104 can be an electronic computing device (e.g., a server, multiple servers, a laptop, a tablet, a cellular phone, a desktop, etc.) configured to monitor transactions performed at different point-of-sale devices and/or on the Internet. The monitoring server 104 can be configured to receive transaction data for transactions as users perform the transactions. The monitoring server 104 can store one or more fraud detection policies that include patterns of transactions and/or criteria that, if satisfied by transactions of an account or a particular transaction, indicate a fraudulent transaction and/or an account may have been compromised by a malicious entity. Examples of rules that may be used to identify a potentially fraudulent transaction may be that an account was used to make a purchase with a value above a threshold or that an account was used to perform a transaction for a particular type of item or at a particular location. Examples of rules that may be used to determine an account may have been compromised may be that an account was used to perform multiple transactions at a different location than previous transactions, there was a substantial increase in the values of transactions performed by an account, or there was a sudden increase in the frequency of transactions, or any combination of such rules.

The monitoring server 104 can monitor accounts over time. For example, as the monitoring server 104 receives data regarding transactions, the monitoring server 104 can compare the transaction data to the fraud detection policies. Responsive to determining a fraud detection policy is satisfied, the monitoring server 104 can automatically generate an alert of potential fraud with an account and transmit the alert to an electronic device of the owner of the account. The monitoring server 104 may do so by generating an email using a form template or by generating an electronic voice message and transmitting or sending the generated email or electronic voice message to the electronic device of the owner of the account.

The monitoring server 104 may only monitor accounts that the fraud ring detection server 102 flags for monitoring. For example, the fraud ring detection server 102 may perform the systems and methods described herein to identify one or more accounts that are potentially fraudulent and transmit a record to the monitoring server 104 indicating the potentially fraudulent accounts. The monitoring server 104 can identify the accounts in the record and monitor transactions performed through the account against fraud detection policies stored in memory.

In some cases, instead of only monitoring accounts that the fraud ring detection server 102 flags for monitoring, the monitoring server 104 may use a weighting schema to determine whether the accounts are fraudulent or not. For example, the monitoring server 104 can weight the transaction data of different transactions performed by accounts based on whether the fraud ring detection server 102 has flagged the accounts as potentially fraudulent or not. The monitoring server 104 can do so by making it more likely that the monitoring server 104 detects potential fraud in a flagged account, such as by lowering the transaction value threshold or the frequency threshold to determine whether an account is fraudulent or not of accounts the fraud ring detection server 102 determines are fraudulent. In doing so, the monitoring server 104 may detect fraud more quickly and more accurately, while avoiding false positives that may occur by applying the lowered thresholds to every account. The monitoring server 104 may use any weighting scheme to detect fraud in flagged accounts.

In some cases, the monitoring server 104 can facilitate a user monitoring flagged accounts. For example, the user device 106 can communicate with the monitoring server 104. The user device 106 can communicate with the monitoring server 104 through the network 105 or a separate network local to the monitoring server 104 (e.g., via a local area network (LAN) connection). Through the communication, the monitoring server 104 can provide a platform (e.g., an electronic platform) through which the user device 106 can view accounts that perform transactions and the data of the transactions performed by the accounts. The monitoring server 104 can transmit identifications (e.g., identifying text strings) of any accounts flagged as fraudulent or potentially fraudulent to the user device 106, and the user device 106 can display the identifications through a user interface presented on a display of the user device 106. The user can view the transactions performed by the flagged accounts and determine whether the accounts are fraudulent or potentially fraudulent based on the transactions. The user can initiate remediation techniques responsive to determining transactions performed by an account indicate the account is fraudulent or potentially fraudulent. Examples of such remediation techniques may be or include deactivating the account, communicating with the user associated with the account through an electronic message (e.g., an email) or a phone call, or by otherwise placing a flag in the account.

The user device 108 can be an electronic computing device (e.g., a cellular phone, a laptop, or a tablet or any other type of computing device). The user device 108 can include a display with a microphone, a speaker, a keyboard, a touchscreen and/or any other type of input/output device. A user can access a platform provided by the fraud ring detection server 102 through the user device 108 to view data of a nodal data structure generated by the fraud ring detection server 102. In some cases, the user can request analytics from the fraud ring detection server 102 through the user device 108, and the fraud ring detection server 102 can generate and/or transmit the requested analytics to the user device 108 in response to the request. For example, the user device 108 can request data regarding transactions performed by different accounts from the fraud ring detection server 102, and the fraud ring detection server 102 can retrieve and transmit the requested data back to the user device 108.

The fraud ring detection server 102 may comprise one or more processors that are configured to generate a nodal data structure (e.g., a node graph) and use the nodal data structure to detect fraud rings. The fraud ring detection server 102 may comprise a network interface 110, a processor 112, and/or memory 114. The fraud ring detection server 102 may communicate with the monitoring server 104 and/or the user device 108 via the network interface 110, which may be or include an antenna or other network device that enables communication across a network and/or with other devices. The processor 112 may be or include an ASIC, one or more FPGAs, a DSP, circuits containing one or more processing components, circuitry for supporting a microprocessor, a group of processing components, or other suitable electronic processing components. In some embodiments, the processor 112 may execute computer code or modules (e.g., executable code, object code, source code, script code, machine code, etc.) stored in memory 114 to facilitate the activities described herein. The memory 114 may be any volatile or non-volatile computer-readable storage medium capable of storing data or computer code.

The memory 114 may include a graph generator 116, a graph updater 118, a fraud detector 120, a graph filter 122, a graph analyzer 124, a transaction database 126, and/or a node graph 128. In brief overview, the components 116-124 may generate a nodal data structure based on transaction data of transactions performed through different accounts. The components 116-124 can generate the nodal data structure to include individual nodes or individual data structures that represent different accounts, as well as transaction edges that represent a transfer of currency between accounts represented by nodes. The components 116-124 can determine a node of the node graph includes a fraudulent flag or is otherwise associated with or represents an account that has been flagged fraudulent or potentially fraudulent. Responsive to determining the node includes the fraudulent flag, the components 116-124 can identify a set of nodes of the node graph that are either directly connected to the flagged node with a transaction edge or indirectly connected to the flagged node through or via another node that has a direct connection with the flagged node. The components 116-124 can determine whether any of the set of nodes includes field-value pairs that match field-value pairs of the flagged node according to a matching policy. The components 116-124 can generate the fraudulent flag in nodes that satisfy the matching policy. The components 116-124 can generate a record that includes identifications of the nodes with the fraudulent flag (e.g., a file, document, table, listing, message, notification, etc.), the initially flagged node, and the nodes the components 116-124 determined match the initially flagged node.

The graph generator 116 may comprise programmable instructions that, upon execution, cause the processor 112 to generate the node graph 128, also described herein as a nodal data structure 128. The graph generator 116 can generate the node graph 128 to include individual nodes or individual data structures that represent different accounts as well as transaction edges that each represent a transfer of currency between accounts represented by the nodes. Each node can include a separate data structure (e.g., a table, a Strapi model, an array, a list, etc.). The graph generator 116 can generate the node graph 128 using data stored in the transaction database 126.

The transaction database 126 can be or include a relational database or a graphical database. The transaction database 126 can include transaction data for transactions performed by different accounts (e.g., transactions performed by entities associated with the accounts). The accounts can be accounts associated with or managed by a particular financial institute, for example. The accounts can correspond with transactions or store currency data of or for individual users. The transaction data can include, for individual transactions performed through the accounts, a transaction amount (e.g., a value or a transaction value), a timestamp indicating the time in which the transaction was performed or completed, identifications of the accounts participating in the transaction, the location of the transaction, and/or any other data regarding the transactions. In some cases, one or more, or all, of the transaction data in the transaction database 126 is for transactions in which one account of the financial institute transfers currency to another account of the financial institute. The transaction database 126 can store the transaction data in records and/or data structures (e.g., tables) for the individual accounts.

The fraud ring detection server 102 can store data for transactions in the transaction database 126 over time. For example, the fraud ring detection server 102 can receive transaction data from the computers and/or servers that manage or otherwise facilitate the transactions as the transactions are processed and/or completed. Responsive to receiving the transaction data, the fraud ring detection server 102 can store the transaction data in the transaction database 126 in records for the individual transactions. The fraud ring detection server 102 can store the records in the data structures within the transaction database 126 for the accounts participating in the transactions. The fraud ring detection server 102 can generate and store such records for transactions as the fraud ring detection server 102 receives transaction data for the transactions over time.

In some cases, the transaction database 126 may store account data in the transaction database 126. The account data may include an identifier or identification (e.g., a number) of an account, demographic data (e.g., name, age, etc.) regarding the individual associated with the account, data regarding the settings or account creation detail (e.g., the date the account was created), etc. In some cases, the account data can include a customer number indicating an entity (e.g., an individual or organization) that owns or is otherwise associated with the account. The fraud ring detection server 102 can include such account data (e.g., including the customer numbers) in the data structures for the accounts based on user inputs and/or by extracting the data from transaction data of individual transactions.

The graph generator 116 can use the transaction data in the transaction database 126 to generate the node graph 128. To do so, the graph generator 116 can identify account data regarding the different accounts from the transaction database 126 or from another data source (e.g., another database or computer storing such account data). The graph generator 116 can generate nodes (e.g., account nodes) in the node graph 128 for the individual accounts using the account data. The graph generator 116 can do so by including the account data for the accounts in the respective nodes for the accounts (e.g., including any combination of the account data for the accounts in the respective nodes). The graph generator 116 can then use the transaction data for the accounts to generate transaction edges between nodes of the node graph 128.

When generating the nodes, the graph generator 116 can include both present account data and historical account data in the respective nodes. For example, the transaction database 126 can include different values of account data of the same type as the account data changes. For instance, the transaction database 126 can store records of changes in address, phone number, name, etc., for different accounts, in some cases with timestamps indicating the day or time the changes were recorded for the accounts or were performed. The graph generator 116 can include the historical values of such transaction data in the nodes of the node graph, in some cases with the respective timestamps.

Transaction edges between two nodes of the node graph 128 may indicate individual transactions between the accounts represented by the two nodes. The graph generator 116 can generate the transaction edges between nodes based on the transaction records the graph generator 116 retrieves from the transaction database 126. For example, the graph generator 116 can retrieve records for the individual transactions from the transaction database 126 and identify the accounts that were involved in the transactions from the records. The graph generator 116 can generate a separate link between nodes representing the identified accounts for each record. The graph generator 116 can generate a transaction edge between two nodes, for example, by inserting an identifier (e.g., an account number) of the other node connected by the transaction edge in each of the two nodes. The graph generator 116 can similarly generate transaction edges between two nodes for any number of transactions and/or pairs of nodes that participated in a transaction together.

The graph generator 116 can combine nodes (e.g., account nodes) that the graph generator 116 determines correspond to the same or a common entity. For example, the graph generator 116 can identify or determine nodes or accounts that correspond to (e.g., that are owned by) the same or a common entity with each other. The graph generator 116 can perform the determination in a variety of manners. For instance, the graph generator 116 can identify the customer numbers of the different accounts or account nodes and compare the customer numbers between each other. The graph generator 116 can identify nodes or accounts that have matching (e.g., the same or identical) customer numbers between each other and collapse or combine such nodes (e.g., pairs of nodes or respective pairs of nodes) or accounts into single or individual consolidated nodes. In another example, the graph generator 116 can determine nodes or accounts with the same name and address correspond to a common entity and combine or collapse the nodes or accounts into single or individual consolidated nodes. The graph generator 116 can determine the nodes correspond to common entities in any manner.

In some embodiments, the graph generator 116 can determine a pair of nodes correspond to a common entity based on the transaction edges between the nodes. For example, the graph generator 116 can store a set of criteria of different transaction patterns or characteristics that indicate whether a pair of nodes correspond to the same entity. Examples of such criteria may be that the two nodes complete a threshold number of transactions between each other, that the two nodes complete a threshold number of transactions between each other within a time period, that the two nodes are within a threshold radius of each other for a threshold number of transactions, etc. If one or more such criteria are satisfied, the graph generator 116 may determine the nodes correspond to the same entity and collapse the nodes together. The graph generator 116 can use any criteria to determine whether nodes correspond to the same entity.

The graph generator 116 may collapse two nodes together by replacing the two nodes (e.g., two account nodes) and edges connected to the two nodes with a single node (e.g., a single consolidated node) and edges connected to the single node. For example, after determining two nodes correspond to the same or a common entity, the graph generator 116 may remove the two nodes and the transaction edges connected to the two nodes (e.g., edges between the two nodes and/or edges connecting the two nodes to other nodes) from the node graph 128. The graph generator 116 can insert a new consolidated node (e.g., a single consolidated node) into the node graph 128 in place of the two nodes. The graph generator 116 can generate the consolidated node by inserting field-value pairs of the two nodes (e.g., the account data of the two nodes) into the new node. The graph generator 116 can generate an identifier (e.g., using a random number generator or using a sequential number generator technique) of the collapsed node and insert the identifier of the consolidated node into the consolidated node. The graph generator 116 can also generate transaction edges between the consolidated node and other nodes within the node graph 128 that match the previous edges between the two nodes and other nodes of the node graph. In one example of generating the transaction edges, the graph generator 116 can insert identifiers from the initial two nodes of other nodes of the node graph 128 into the consolidated node and replace the identifiers in the other nodes of the initial two nodes with the identifier of the consolidated node. The graph generator 116 can generate new data structures for the transaction edges between the consolidated nodes and the other nodes of the node graph 128. The new data structures can be or include data for the transactions represented by the respective transaction edges. The graph generator 116 may collapse the two nodes together using any method. The graph generator 116 may similarly collapse any number of nodes into a single consolidated node and/or generate any number of consolidated nodes in this manner.

The graph updater 118 may comprise programmable instructions that, upon execution, cause the processor 112 to update the node graph 128. For example, the graph updater 118 can update the node graph 128 as the accounts associated with the nodes of the node graph 128 perform transactions. For example, the fraud ring detection server 102 can receive transaction data regarding different transactions over time. The fraud ring detection server 102 can store the transaction data in the transaction database 126. The graph updater 118 can retrieve the transaction data for the individual transactions from the transaction database 126 and generate links (e.g., transaction edges) between nodes representing the accounts involved in the transactions in the node graph 128. In some cases, the graph updater 118 can similarly update the node graph 128 directly after the fraud ring detection server 102 without retrieving the transaction data from the transaction database 126 (e.g., by retrieving the transaction data from a cache or volatile memory of the fraud ring detection server 102).

The fraud detector 120 may comprise programmable instructions that, upon execution, cause the processor 112 to detect fraudulent nodes or potentially fraudulent nodes in the node graph 128. The fraud detector 120 can detect the fraudulent nodes or potentially fraudulent nodes in the node graph 128 based on flags in the respective fraudulent nodes or potentially fraudulent nodes of the node graph 128. For example, an account associated with a node within the node graph 128 may be flagged as fraudulent or potentially fraudulent. The account may have been flagged because the account performed a fraudulent transaction, for example. The account may have been flagged based on a monitoring server (e.g., the monitoring server 104) or monitoring service determining the account performed a transaction (e.g., a fraudulent transaction) that was fraudulent or likely fraudulent or a series of transactions that were fraudulent or likely fraudulent. In some embodiments, the monitoring server or monitoring service may have made such a determination based on the owner of the account reporting the account as being associated with fraud (e.g., being hacked) or based on the transaction or sequence of transactions satisfying fraud detection criteria, such as a performing a high frequency of transactions within a short timespan, performing a sudden increase in transactions with a high value, and/or performing transactions in a different geographical location than normal. The account may have been flagged automatically or based on a human input (e.g., based on a user input at a user interface, such as at a user interface display on the user device 106). The monitoring server or service may transmit an indication of the flagging of the account to the fraud ring detection server 102 that includes an identification of the account and an indication that the account was flagged as fraudulent or for performing a fraudulent transaction.

In some embodiments, the fraud detector 120 can determine the node is associated with a fraudulent account (e.g., determining the entity represented by the node facilitated a fraudulent transaction). The fraud detector 120 can do so by analyzing the transactions performed by the account associated with the node. For example, the fraud detector 120 can store transaction patterns in memory that correspond to fraud. The transaction patterns can be the same as or similar to the transaction patterns of the fraud detection criteria as described above. The fraud detector 120 can apply the transaction patterns to transaction edges of different nodes and identify any nodes with transaction edges that satisfy a transaction pattern as fraudulent or potentially fraudulent.

Responsive to receiving the indication of the fraudulent account or otherwise determining the account is fraudulent based on the transaction pattern of the account, the graph updater 118 can update the node for the fraudulent account to indicate that the account was flagged as fraudulent or for performing a fraudulent transaction. The graph updater 118 can do so, for example, by inserting a fraudulent flag (e.g., a value or setting indicating the account performed or facilitated a fraudulent transaction) into the node corresponding to the account.

The fraud detector 120 can detect the fraudulent flag in the node. For example, the fraud detector 120 can be configured with an interrupt that automatically detects when a fraudulent flag is added to a node within the node graph 128 and/or the fraud ring detection server 102 has received an indication that an account was flagged as fraudulent or potentially fraudulent. The fraud detector 120 can determine when the fraudulent flag is added to the node and identify an identifier of the node from data in the node.

The fraud detector 120 can use the node graph 128 to determine other nodes that are involved in the same fraud as the flagged node (e.g., nodes of a fraud ring). For example, responsive to determining the node includes a fraudulent flag, the fraud detector 120 can identify a set of nodes within the node graph 128 that have a direct transaction edge connection with the flagged node and/or an indirect transaction edge connection with the flagged node via at least one node directly connected with the flagged node. The fraud detector 120 can do so by following the transaction edges directly from the flagged node to nodes directly connected to the flagged node and then the transaction edges from directly connected nodes to the further connected nodes. For example, the fraud detector 120 can determine node A includes a fraudulent flag. Responsive to the determination, the fraud detector 120 can identify nodes B, C, and D based on nodes B, C, and D having direct transaction edges with the node A. The fraud detector 120 can then identify nodes E and F based on the nodes E and F having direct connections with node B. The fraud detector 120 can identify any number of nodes within the set of nodes from the node graph 128.

The fraud detector 120 can determine which of the set of nodes satisfy a matching policy with the node flagged as fraudulent. The matching policy can include one or more rules or functions that the fraud detector 120 can use to determine whether nodes match or have matching field-value pairs (e.g., field-value pairs of account data). The matching policy can include one or more rules for matching personally identifiable information (PII) between nodes. The fraud detector 120 can iteratively apply the rules between the field-value pairs of the node flagged as fraudulent and the field-value pairs of the set of nodes identified as having a direct or indirect connection with the flagged node (e.g., compare field-value pairs of node A and node B, then node A and node C, then node A and node D, then node A and node E, and then node A and node F). The fraud detector 120 can determine any node of the set of nodes that satisfies the matching policy with the flagged node is a fraudulent node or a potentially fraudulent node.

In some embodiments, the fraud detector 120 may apply the matching policy by only comparing field-value pairs of nodes that are directly connected with each other. For example, the fraud detector 120 may detect a fraudulent flag in node A. Node A may be directly connected with nodes B and C. Node B may be directly connected with node D. To determine node A and node D are associated with or a part of the same fraud ring, the fraud detector 120 may determine if one or more field-value pairs of node A match corresponding field-value pairs (e.g., field-value pairs of the same type or attribute type) of node B. The fraud detector 120 may determine (e.g., determine responsive to determining node A and node B match) whether node B and D have one or more matching field-value pairs. Responsive to determining node A and node B match and that node B and node D match, the fraud detector 120 may determine nodes A, B, and D are a part of the same fraud ring. The fraud detector 120 may do so without comparing field-value pairs of nodes A and D, thus conserving processing resources and reducing latency of determining fraud rings.

The fraud detector 120 may only apply the matching policy between the flagged node and the identified set of nodes with the direct or indirect connection with the flagged. Doing so may greatly reduce the processing resources required to identify fraudulent accounts or nodes compared with systems that may apply matching rules between the flagged node and the nodes of the node graph. For instance, there may be millions of nodes in the node graph 128. A conventional system may apply a matching policy between a flagged node and each node of the node graph to determine fraudulent nodes. This process can take a large amount of processing power and a large amount of time given the large amount of nodes in the node graph 128. By only performing the process on the nodes with direct and indirect connections with the flagged node, the fraud detector 120 can apply the matching policy to a much smaller set of nodes and thus reduce the number of rule applications to determine fraudulent nodes.

The fraud detector 120 can apply the matching policy on PII attributes, such as Internet Protocol (IP) address/device address or identification (ID), address, phone, email, and tax ID. The fraud detector 120 can apply matching rules of the matching policy between field-value pairs (e.g., first field-value pairs) of the flagged node and field-value pairs of the identified set of nodes of such PII attributes. In doing so, the fraud detector 120 can identify fuzzy matches and/or exact or identical matches between field-value pairs of the same type. For example, node A might not have exactly the same phone number as node B, but the numbers may have a small amount of variable. The variation could take place arbitrarily within the two phone strings. For instance, the phone numbers might have different ending digits such as (651) 123-5555 vs (651) 123-5558, or they might have different area codes such as (651) 123-5555 vs (612) 123-5555. The fraud detector 120 can determine the similar but different phone numbers are fuzzy matches using an edit distance measure, such as the Levenshtein distance formula. With the edit distance measure, the fraud detector 120 can determine if a pair of the phone numbers are similar to each other within a certain threshold value, where two identical phone numbers are a special case with 100% similarity.

Similarly, the fraud detector 120 can apply matching rules to other PII attributes, such as address, email, and tax ID that could be altered. When measuring the variations of address and email, the fraud detector 120 can use the edit distance measure or apply a Cosine similarity function. The Cosine similarity function may have an advantage over the edit distance when dealing with the semantic similarity, for example. For instance, an address may include a street number, a street name, street type, street direction, room/suite number (if there is any), city, state, and zip code. Because of the number of components in an address, there may be many ways for a malicious entity to manipulate the address. In one example, a malicious entity may change the street number, switch the position of the street direction, or edit the room/suite number inside the address string. The Cosine similarity is useful for handling the different variations and determining if an address pair is highly relevant or similar by a certain threshold value compared with an edit distance function, which may have a larger margin of error in determining a correct fuzzy match. The fraud detector 120 may use exact matches for attribute-value pairs where differences are likely or by definition correspond to a different entity, such as tax ID or IP address/device address.

In some embodiments, the fraud detector 120 may be configured to use multiple methods together to measure the similarity of some PII attributes. For example, the fraud detector 120 may use the edit distance function to compare the digit tokens inside address strings, while using the Cosine similarity to compare the remaining part of the strings. The fraud detector 120 can use a similarity threshold for the edit distance function or the Cosine similarity needs, which can be configured based on the type of field-value pair and/or as set by a user. The fraud detector 120 can determine two nodes satisfy the matching policy responsive to one, or at least a defined or predetermined number, of the attribute-value pairs between the two nodes match according to the application of the matching policy.

In some embodiments, when applying the matching policy between the flagged node and individual nodes of the set of nodes, the fraud detector 120 may apply the matching policy to both the current values and historical values of field-value pairs within the nodes. For example, as mentioned above, the individual nodes may store records of field-value pair values for different field-value pairs as historical values. Such values may change over time per user request, for example. When applying the matching policy to the field-value pairs of the flagged nodes and field-value pairs of the identified set of nodes, the fraud detector 120 may apply the rules (e.g., using the fuzzy matching and/or exact matching rules) to each combination of the historical and current field-value pairs of the flagged node and historical and current field-value pairs of the identified set of nodes. For example, the fraud detector 120 may identify five historical values for the address of the flagged node A and three historical values for the address of a linked node B. The fraud detector 120 can apply a Cosine similarity function to historical values of the address of the flagged node A and historical values of the address of the linked node B. The fraud detector 120 may determine a match or that the matching policy is satisfied between the node A and the node B responsive to determining at least one of the outputs of the Cosine similarity function for a historical value or a current value of node A and a historical value or current value of node B are above a threshold. The fraud detector 120 can similarly apply the matching policy to the different types of field-value pairs of the nodes to determine whether there is a match between nodes.

In some embodiments, the fraud detector 120 may apply exact matching requirements with the current and/or historical IP address/device ID and fuzzy matches including the edit distance and Cosine similarity with the other four attributes. Because fuzzy matches are usually computationally expensive and far more computationally expensive than exact matches using the node graph 128 to identify the set of nodes to which to apply the matching techniques instead of applying the matching techniques between every combination of nodes can substantially reduce the processing resources and latency of determining fraudulent accounts or nodes.

The fraud detector 120 can use combined nodes (e.g., consolidated nodes) within the node graph 128 to further reduce the amount of computation that is required to detect fraudulent or potentially fraudulent nodes. For example, because the combined nodes are representations of multiple accounts, there may be instances in which only one of the accounts of a combined node is flagged for being fraudulent or for fraudulent behavior. In this case, the fraud detector 120 can flag the entire combined node that represents at least the flagged fraudulent account as being fraudulent or potentially fraudulent. The fraud detector 120 can compare field-value pairs of the flagged combined node with the nodes linked with the combined node through transaction edges. The fraud detector 120 will not determine whether any of the other accounts match the flagged node because they have been determined to be associated with or correspond to the same or a common entity. In this way, the fraud detector 120 further reduces the processing resources required to identify fraudulent nodes or fraudulent accounts.

The graph updater 118 can update the node graph 128 based on the fraud determinations by the fraud detector 120. For example, the graph updater 118 can identify the nodes (e.g., a subset of nodes) of the set of nodes directly or indirectly linked with the initially flagged node that the fraud detector 120 determined satisfies the matching policy. The graph updater 118 can insert fraudulent flags in each of the identified nodes, thus indicating the nodes are a part of or are potentially a part of a fraud ring with the initially flagged node.

In some embodiments, the fraud detector 120 may only detect fraud rings or otherwise flag nodes as being associated with a fraud ring responsive to determining two or more nodes have been flagged for performing a fraudulent transaction. For example, the graph updater 118 can flag two separate accounts associated with nodes in the fraud graph as performing a fraudulent transaction (e.g., separate fraudulent transactions from each other). The fraud detector 120 can detect flags in the nodes representing the accounts and determine whether the nodes are directly or indirectly connected with each other through transaction edges. Responsive to determining the nodes are not directly or indirectly connected, the fraud detector 120 can determine the instances of fraud are separate from each other or otherwise that the two accounts are not a part of a fraud ring.

However, responsive to determining the nodes are directly or indirectly connected, the fraud detector 120 can apply the matching policy to the nodes that are a part of the connection. For instance, the fraud detector 120 can determine nodes A and B were each flagged as representing an account that performed a fraudulent transaction. The fraud detector 120 can determine nodes A and B have a direct connection with each other through a transaction edge. Based on the determination of the direct connection, the fraud detector 120 can apply the matching policy to the respective field-value pairs of the nodes A and B. Responsive to determining the matching policy is satisfied (e.g., determine a match for at least one field-value pair of the two nodes A and B), the fraud detector 120 can determine the two nodes correspond to the same fraud ring and update the nodes with an identifier of the fraud ring (e.g., a number or value the fraud detector generates responsive to the detection). Otherwise, the fraud detector 120 may determine the two nodes are not a part of a fraud ring or at least an identity related fraud ring. In cases in which nodes A and B are not directly connected and instead are indirectly connected through a node C, the fraud detector 120 can determine nodes A and B are a part of a fraud ring responsive to determining node A satisfies the matching policy with node C and node C satisfies the matching policy with node B. In such cases, the fraud detector 120 can additionally determine node C is a part of the fraud ring and update each of the nodes A, B, and C with an identifier of the fraud ring. In some embodiments, the fraud detector 120 can additionally perform the matching policy on other nodes that are directly or indirectly connected with the nodes A, B, and C, in some cases in response to determining nodes A, B, and C are a part of a fraud ring. The fraud detector 120 can update each node determined to satisfy the applied matching policy with an identifier of the fraud ring.

The fraud detector 120 can transmit a message to the monitoring server 104 indicating the detected or determined fraud ring. The fraud detector 120 can generate a record identifying the account that was initially flagged for performing fraud and/or accounts associated with the nodes that the fraud detector 120 determined match the initially flagged node using the matching policy. The fraud detector 120 can transmit the record to the monitoring server 104 in a message, such as through an application programming interface (API) of the fraud ring detection server 102.

The monitoring server 104 can receive the message from the fraud ring detection server 102. Responsive to receiving the message, the monitoring server 104 can monitor transactions performed by the nodes identified in the message. The monitoring server 104 can monitor the transactions over time according to a fraud detection policy automatically or via a user accessing the user device 106, as described above.

The graph filter 122 may comprise programmable instructions that, upon execution, cause the processor 112 to filter the node graph 128 according to requests or received criteria. The graph filter 122 can filter the node graph 128 to reduce or consolidate the number of nodes or transactions in the node graph 128. The graph filter 122 may do so based on criteria received in a request. For example, the fraud ring detection server 102 can receive a request (e.g., from the user device 108) for data regarding transactions performed within the immediately previous six months. The node graph 128 may have been generated with transaction data of transactions from the previous two years. The graph filter 122 can receive the request and identify the transaction edges that correspond with timestamps (e.g., timestamps in data structures corresponding to the transaction edges) within the last six years and generate a new version of the node graph 128 that only includes transaction edges with the identified timestamps within the previous six months and nodes connected with such transaction edges. In another example, the graph filter 122 can generate a new node graph for transactions only with transaction amounts above a threshold identified in a request or below a threshold identified in a request. The graph filter 122 can generate such node graphs based on any criteria and/or based on any transaction attribute. By filtering the node graph 128 in this way, the graph filter 122 can reduce the processing requirements of analyzing the node graph 128, in some cases further reducing the processing resources required to process requests after consolidating nodes that correspond with common entities.

The graph analyzer 124 may comprise programmable instructions that, upon execution, cause the processor 112 to analyze data according to requests. The graph analyzer 124 may analyze the node graph 128 after the graph filter 122 filters the node graph 128, in some embodiments, or otherwise after the graph generator 116 generates the node graph 128 or the graph updater 118 updates the node graph 128. The graph analyzer 124 can identify the contents of requests and identify the transaction edges and/or nodes that correspond with the requests. The graph analyzer 124 can apply different functions on the data of the identified transaction edges and/or nodes to generate responses to the requests. For instance, the user device 108 may request a sum of the transactions performed within the immediately previous six months. In response to receiving the request, the graph filter 122 can generate a new version of the node graph 128 that only includes nodes and/or transaction edges that correspond with timestamps within the previous six months. The graph analyzer 124 can aggregate the transaction values from the data structures of the transaction edges of the new version of the node graph 128 to generate an aggregated value. The graph analyzer 124 can input the generated value into a record and transmit the record to the user device 108. The user device 108 may display the generated value on a user interface.

Figure 2:
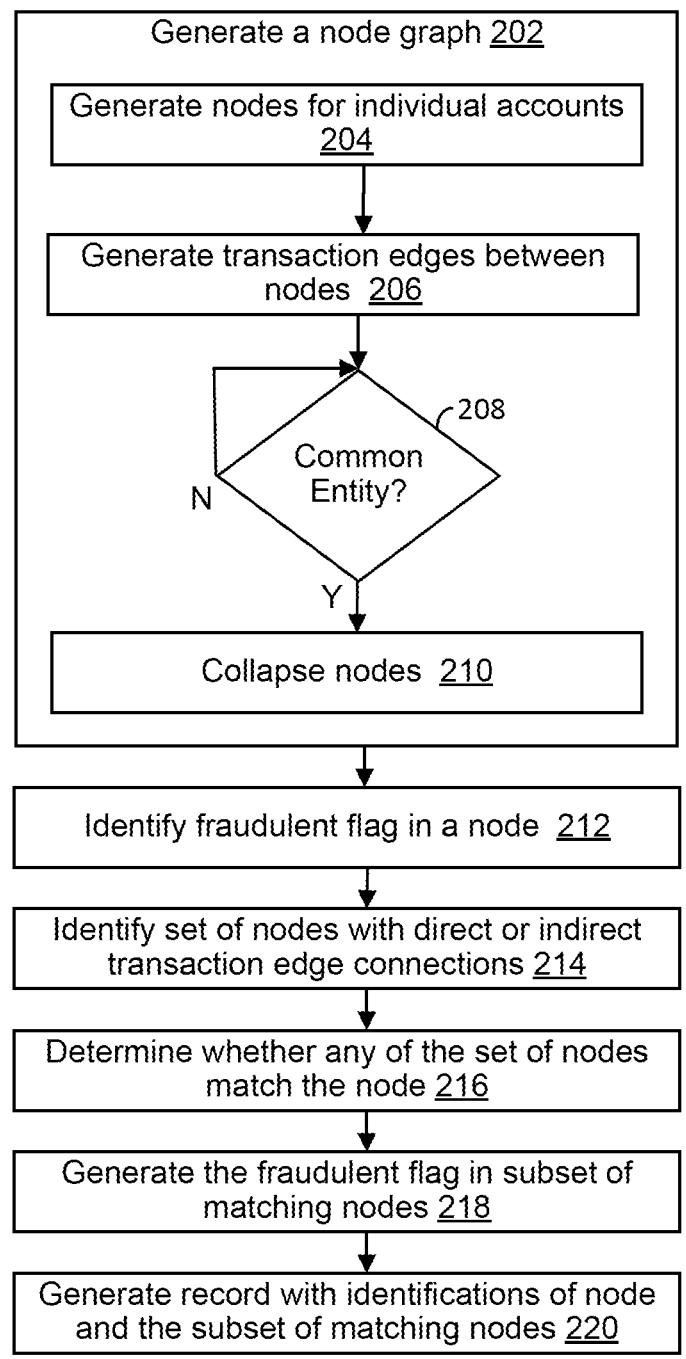
FIG. 2 illustrates an example method for fraud ring detection using a nodal data structure, in accordance with an implementation.

FIG. 2 illustrates an example method 200 for fraud ring detection using a nodal data structure, in accordance with an implementation. The method 200 can be performed by a data processing system (e.g., the fraud ring detection server 102, a client device or one of the user devices 106 or 108, the monitoring server 104, each shown and described with reference to FIG. 1, a server system, etc.). The method 200 may include more or fewer operations and the operations may be performed in any order. Performance of the method 200 may enable the data processing system to automatically detect and/or remediate fraud rings of accounts using transaction edges between nodes in the nodal data structure. The method 200 may enable the data processing system to do so with less latency and using fewer processing resources than conventional methods of fraud detection.

In the method 200, at operation 202, the data processing system generates a node graph. The data processing system can generate the node graph to have nodes that represent or correspond to different accounts of a financial institution and/or entities (e.g., individuals or organizations) associated with the accounts. Such accounts can be associated with the same financial institution as the data processing system and enable users to access and/or perform actions with their accounts by communicating with the data processing system. The data processing system can link nodes within the node graph together with transaction edges that represent transactions between the accounts represented by the nodes linked by the transaction edges.

For example, in generating the node graph, at operation 204, the data processing system generates nodes for individual accounts. The data processing system can generate the nodes by pulling or retrieving data for the accounts from a database in memory or based on data received via user input. The data processing system can generate the nodes to include individual field-value pairs that represent different types of attributes of entities or accounts. For example, the data processing system can generate the nodes to have field-value pairs that include values for separate demographic data of individuals, such as IP address/device ID, address, phone, email, tax ID, etc. In some embodiments, the data processing system can include customer number field-value pairs in the nodes. The data processing system can retrieve the data from memory or a database that stores such data and populate individual data structures for each account with the retrieved data to generate the nodes that represent the accounts.

At operation 206, the data processing system generates transaction edges between the nodes of the node graph. The transaction edges can indicate a transfer of currency between the accounts associated with nodes connected by the transaction edges. The data processing system can generate the transaction edges by retrieving transaction records of the accounts from memory or a database. The data processing system can identify the entities involved in the transactions and generate edges between nodes of the node graph represented by the entities. The data processing system can include data regarding the transactions in data structures corresponding to the transaction edges. For example, for a transaction between accounts represented by node A and node B, the data processing system can store a data structure for the transaction edge for the transaction between the two nodes that includes transaction data for the transaction, such as amount, location, time, date, currency, etc. The data processing system can similarly generate any number of edges in the node graph. The data processing system can update the node graph over time to include more edges as the accounts represented by the nodes complete transactions.

At operation 208, the data processing system determines whether nodes correspond to the same or a common entity. The data processing system can do so based on the values in the nodes and/or accounts for the nodes. For example, the data processing system can compare customer numbers of the individual nodes with each other. The data processing system can determine any nodes that include the same customer number correspond with the same or a common entity. In another example, the data processing system can determine nodes that include field-value pair values that are an exact match, or a fuzzy match above a threshold using an edit distance function or a Cosine similarity function, corresponding with the same or a common entity. The data processing system can use exact matching on specific types of field-value pairs (e.g., tax ID) and fuzzy matching techniques on other types of field-value pairs (e.g., phone number). The data processing system may identify nodes that correspond to a the same or a common entity based on a defined pattern or set of field-value pairs matching (e.g., tax ID, name and phone number, etc.). In doing so, the data processing system can apply such matching techniques to defined or specific attribute types, such as name, address, email, and/or tax ID. The data processing system can compare the values of the nodes in any way to identify nodes that correspond with a common entity.

At operation 210, the data processing system collapses nodes. The data processing system can collapse pairs or sets of nodes responsive to determining the pairs or sets of nodes correspond with the same or a common entity. The data processing system can collapse a pair or set of nodes by replacing each node of the pair or set of nodes with a single consolidated node that has transaction edges with the same nodes as the replaced pair or set of nodes. The data processing system can include the data of each node of the pair or set of nodes in the single consolidated node. The data processing system can similarly collapse any number of pairs or sets of nodes that the data processing system determined correspond to common entities.

At operation 212, the data processing system identifies a fraudulent flag in a node. The data processing system may have added the fraudulent flag to the node responsive to a monitoring service determining the account associated with or represented by the node facilitated a fraudulent transaction or fraudulent set of transactions or responsive to a user input at a computing device indicating the account represented by the node facilitated a fraudulent transaction or fraudulent set of transactions. The data processing system can be configured to identify the fraudulent flag using an interrupt that is triggered when a fraudulent flag is inserted into the node (or any other node).

At operation 214, the data processing system identifies a set of nodes. The data processing system can identify the set of nodes as nodes with direct or indirect transaction edge connections with the node with the fraudulent flag. The data processing system can identify the set of nodes responsive to detecting or identifying the fraudulent flag or responsive to receiving the indication that the account associated with the node completed a fraudulent transaction or fraudulent set of transactions. The data processing system can identify nodes of the set of nodes with direct connections by identifying each node that is connected with the flagged node by at least one transaction edge. The data processing system can identify the nodes of the set of nodes with indirect connections by identifying each node that is connected with the flagged node through another node of the node graph.

At operation 216, the data processing system determines whether any of the set of nodes match the node (e.g., the flagged node). The data processing system can determine which of the set of nodes match the node using a matching policy that includes different matching rules. The matching rules can include fuzzy matching rules and/or exact matching rules and can correspond to specific types of field-value pairs (e.g., specific attributes). For example, the data processing system can determine a match in tax ID if the two tax IDs exactly match. The data processing system can determine a match in address using a Cosine similarity function and determining the output is above a threshold. The data processing system can determine a match in phone number using an edit distance function and determining the output is below a threshold. The data processing system can determine matches for individual field-value pairs using any method. The data processing system can compare field-value pairs of the same type between the flagged node and the nodes of the set of nodes. The data processing system can determine a match between the node and individual nodes of the set of nodes responsive to determining a match for at least one field-value pair, at least a defined number of field-value pairs, and/or a defined combination of matches (e.g., address plus phone number) for the node and the respective nodes using the matching policy. In this way, the data processing system can identify a subset of nodes of the set of nodes that match the node flagged for facilitating a fraudulent transaction.

At operation 218, the data processing system generates the fraudulent flag in the subset of nodes. The fraudulent flag can indicate that the subset of nodes is fraudulent or potentially fraudulent. The data processing system can include an identification number with the fraudulent flags in the subset of nodes and the initially flagged node that is unique to the subset of nodes and the node. Doing so can label the nodes to indicate that the nodes are a part of the same fraud ring or are otherwise associated with each other.

At operation 220, the data processing system generates a record. The data processing system can generate the record to include identifications of the node and the subset of nodes matching the node. The data processing system can transmit the record to a monitoring server or service. The monitoring server or service can receive the record and monitor the nodes identified in the record for fraudulent transactions or otherwise escalate action to handle the fraudulent behavior.

NON-LIMITING EXAMPLES

Generating Node Graphs with Transaction Edges

Figure 3:
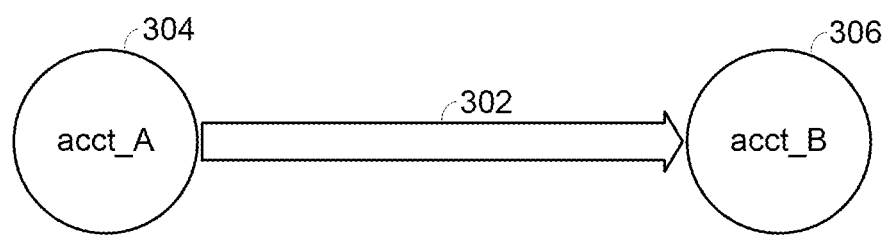
FIG. 3 illustrates an example transaction edge between nodes of a nodal data structure, in accordance with an implementation.

FIG. 3 illustrates an example transaction edge 302 between nodes 304 and 306 of a nodal data structure, in accordance with an implementation. The transaction edge 302 and the nodes 304 and 306 can be components of a node graph (e.g., the node graph 128) stored by a data processing system (e.g., the fraud ring detection server 102). The transaction edge 302 can indicate a transfer of currency from one node (e.g., one account associated with the node) to another node (e.g., an account associated with another node). The transaction edge 302 can be directional, such as by indicating the node 304 transferred a currency to the node 306. The transaction edge 302 can be associated with a feature list that contains information such as account type, product type, transaction amount, transaction distance, transaction means, etc. The feature list can be stored in a data structure dedicated to the transaction edge 302 in memory (e.g., the memory 114 of the fraud ring detection server 102 or another data processing system). Examples of account types include consumer, small business, and business. Examples of product types include checking, savings, HELOC, debit cards, and credit cards. Transaction distance can indicate if the entities associated with the nodes are in the same geolocation or not. The transaction means can include direct payment, check, wire, and App such as ZELLE, PAYPAL, CASH APP, VENMO, etc.

The feature lists of the transaction edges can be used as filters to analyze the nodal data structure. For example, the data processing system may analyze the node graph for fraud detection and not include transaction edges of specific account types (e.g., business) or transaction edges with transaction values below a threshold (e.g., below $50) in the analysis. In some cases, the data processing system can define the transaction edges with aggregated data and then apply the filtering to find relatively stable relationships among the nodes. For example, each transaction edge could be defined using one month of most recent transactions. The features in the feature list can be or include aggregated information, such as transaction frequencies, total transaction amount, average transaction amount, etc. The data processing system can use filtering thresholds against the aggregated feature items to identify features to use for an analysis. The aggregation could be based on a shorter period, such as weekly, or a longer period, such as quarterly, according to the specific analysis requirement.

Account direct payments might be managed by a deposit team, and debit/credit card transactions might be managed by a retail team. In a direct payment system, besides the feature, acct_no, there are two relevant features: account_from and account_to, which are helpful to indicate the payers and payees of the payments. Below is an illustration example of the direct payments:

| acct_no | trans_amt | trans_date | trans_id | acct_no_from | acct_no_to |
|---|---|---|---|---|---|
| acct_A | 225.46 | May 5, 2020 | 0001 | acct_W | acct_A |
| acct_B | 718.33 | May 15, 2020 | 0002 | acct_X | acct_B |
| acct_C | −372.64 | May 21, 2020 | 0003 | acct_C | acct_Y |
| acct_D | −149.56 | May 27, 2020 | 0004 | acct_D | acct_Z |

When the transaction amount is positive, acct_no and acct_no_to are usually identical. When the transaction amount is negative, acct_no and acct_no_from are usually identical. In the feature list, the transaction amount may always be non-negative, as the direction is determined by the node pair in an edge. When transactions are made via Apps such as ZELLE, CASH APP, PAYPAL, AND VENMO, there are no apparent account_from and account_to features available. Instead, the transaction data might contain the following features:

| acct_no | trans_amt | trans_date | acct_type | Description |
|---|---|---|---|---|
| acct_E | 564.00 | Jun. 8, 2020 | consumer | Zelle_01001 |
| acct_F | −564.00 | Jun. 8, 2020 | consumer | Zelle_01001 |
| acct_G | 708.50 | Jun. 9, 2020 | small business | CashApp_03002 |
| acct_H | 312.63 | Jun. 9, 2020 | consumer | Venmo_02004 |

As the trans_amt feature was positive, the first record acct_E received a payment $564.00 via transaction ID Zelle_01001. The second record acct_F had a negative trans_amt value of −$564.00, which means it sent a payment $564.00 via transaction ID Zelle_01001. Since the two accounts shared the same transaction ID and their transaction amounts were matched, the data processing system determined that acct_F sent money to acct_E via ZELLE, and then a transaction edge was established. The data processing system can define transaction edges for the other transactions using the same approach. The transaction edges among bank accounts through check payments or wire could be created similarly by comparing the transaction IDs and dollar amounts.

Below is an illustration example of transactions between bank accounts and credit/debit cards:

| acct_no | trans_amt | trans_date | trans_id | card_type | trans_acct_no |
|---|---|---|---|---|---|
| acct_I | 1132.44 | Jul. 2, 2020 | 0007 | credit | card_01 |
| acct_J | 636.85 | Jul. 14, 2020 | 0008 | debit | card_02 |
| acct_K | −335.48 | Jul. 18, 2020 | 0009 | credit | card_03 |
| acct_L | −279.51 | Jul. 20, 2020 | 0010 | debit | card_04 |

When the trans_amt feature is positive, the bank account receives payments.

Figure 4A:
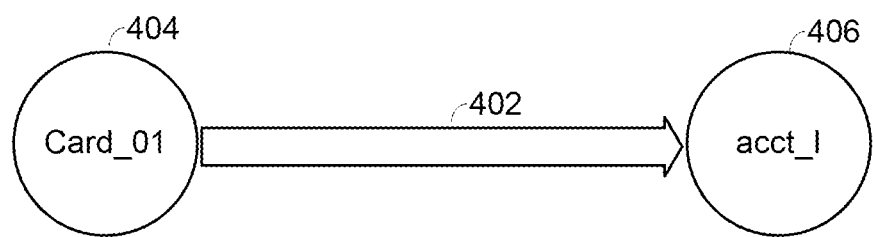
FIGS. 4A and 4B illustrate example transaction edges between nodes of a nodal data structure, in accordance with an implementation.
Figure 4B:
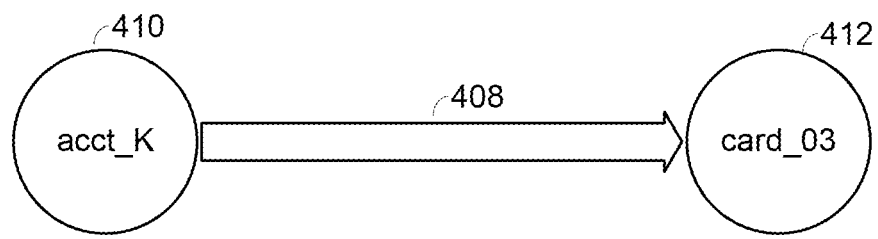

An example of a transaction edge 402 between nodes 404 and 406 depicting the first transaction listed above is illustrated in FIG. 4A. When the trans_amt feature is negative, the bank account sends out payments. An example of a transaction edge 408 between nodes 410 and 412 depicting the third transaction listed above is illustrated in FIG. 4B. The transaction amount in the feature list for the bank account vs credit/debit cards may always be non-negative.

Once all types of transaction edges are created, the data processing system can combine the transaction edges together to form a comprehensive nodal data structure. The features of the transaction edges can be based on aggregations of transactions between the same nodes. To build a transaction linkage graph (e.g., a node graph or a nodal data structure), a longer time scale means more nodes could be included, as an account might have more transactions with the others as time goes by. A graph based on a short time period might not be able to provide sufficient nodes and edges. For instance, the data processing system can generate a nodal data structure initially based on 3 or 6 months of transactions. The data processing system can adjust the nodal data structure by expanding or minimizing the time period of transactions to represent in the nodal data structure based on user inputs, for example. In some cases, the features of the transaction edges can correspond to transactions of time periods smaller than the time period based on which the data processing system generated the nodal data structure. For example, the data processing system may generate a nodal data structure based on transactions that occurred within a defined time period (e.g., three or six months), but may include smaller time windows of data for different features for edges between nodes. For instance, the features could be defined at a more granular level, such as weekly or monthly averages, and so on. In some embodiments, after generating the nodal data structure, the data processing system can use standard graphical analytics, such as Connected Components, Label Propagation, or PageRank, on the nodal data structure.

Connected Components and Label Propagation could be used to define individual sub-graphs, which are relevant accounts, and/or credit/debit cards that are linked by the transaction edges. Sub-graphs may be of interest to the business analysts, as they might contain meaningful patterns or signals of the money movements among individual accounts and cards.

Figure 5:
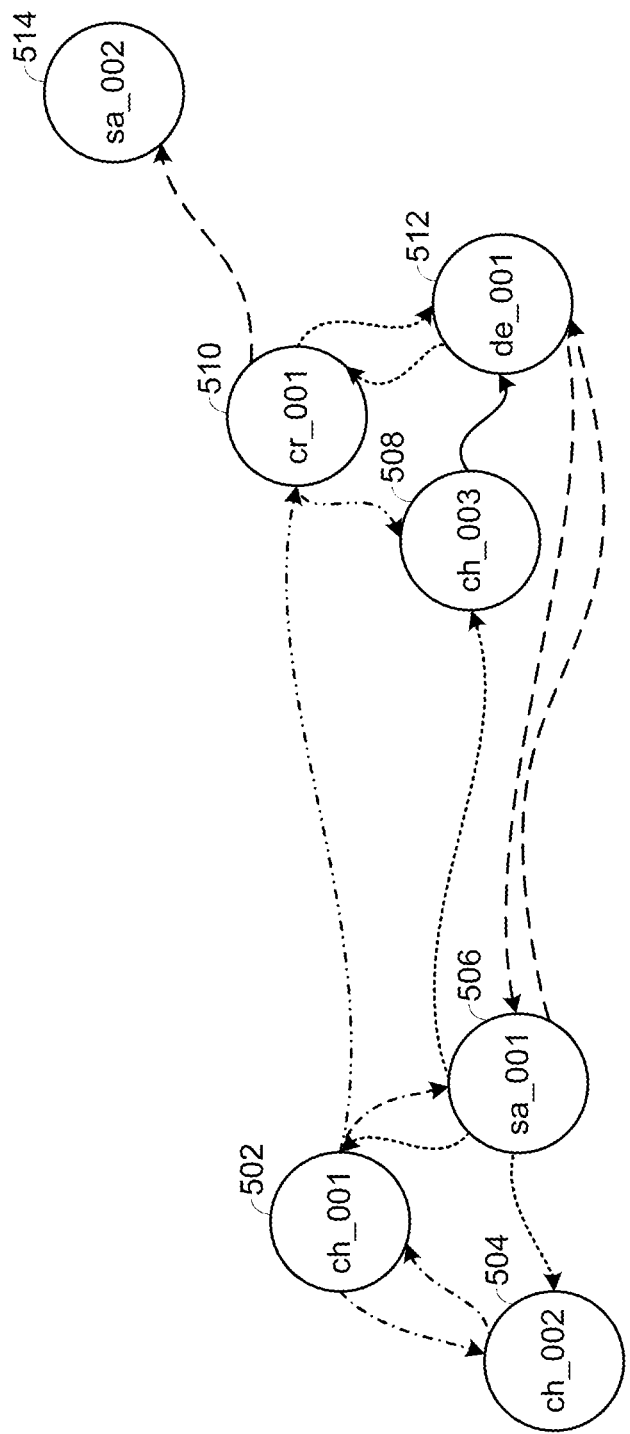
FIG. 5 illustrates an example nodal data structure, in accordance with an implementation.

FIG. 5 illustrates an example sub-graph 500 that contains 7 nodes. In FIG. 5, the prefix of the node label 'ch' stands for the checking account, 'sa' the saving account, 'cr' the credit card, and 'de' the debit card. The nodes 502 and 504 are shown to be linked by two transaction edges, which means the two nodes received and sent out payments from each other. Even though there are only seven nodes, it may not be straightforward to trace money movement among the nodes. Since all the accounts and credit/debit cards belong to the same institution, each of the accounts and cards may correspond to (e.g., store in the nodes for the accounts and/or cards) an institution-level customer ID. In some cases, the data processing system can define a customer ID using account profile information of accounts represented by the nodes of the sub-graph 500. In testing, it has turned out that a significant amount of accounts and cards might share the same customer ID, as a customer might have multiple accounts or products with the financial institution. For example, the nodes 502, 504, and 506 may share the same customer ID (e.g., cid_01). In other words, part of the above sub-graph 500 illustrates accounts allocating or transferring currency between accounts represented by the nodes 502, 504, and 506 that each correspond to the same customer ID. Such may be commonplace, for example, for customers who may move deposits from checking accounts to saving accounts for higher interests, or vice vera for an upcoming payment.

For risk management and anti-money laundering processing, intra-customer money movements may be of less interest to analysts. The data processing system may allocate processing and memory resources to analyzing inter-customer money movements. To reduce the processing burden on analyzing the sub-graph 500 for risk management and/or anti-money laundering processing, the data processing system can simplify the sub-graph 500 by collapsing accounts and cards based on customer IDs of the respective accounts and cards. In doing so, the data processing system can determine that nodes 508, 510, and 512 belong to another customer ID cid_02 and that node sa_002 514 belongs to a third customer ID cid_03, for example. The data processing system can collapse the nodes with the same customer IDs into respective consolidated nodes.

Figure 6:
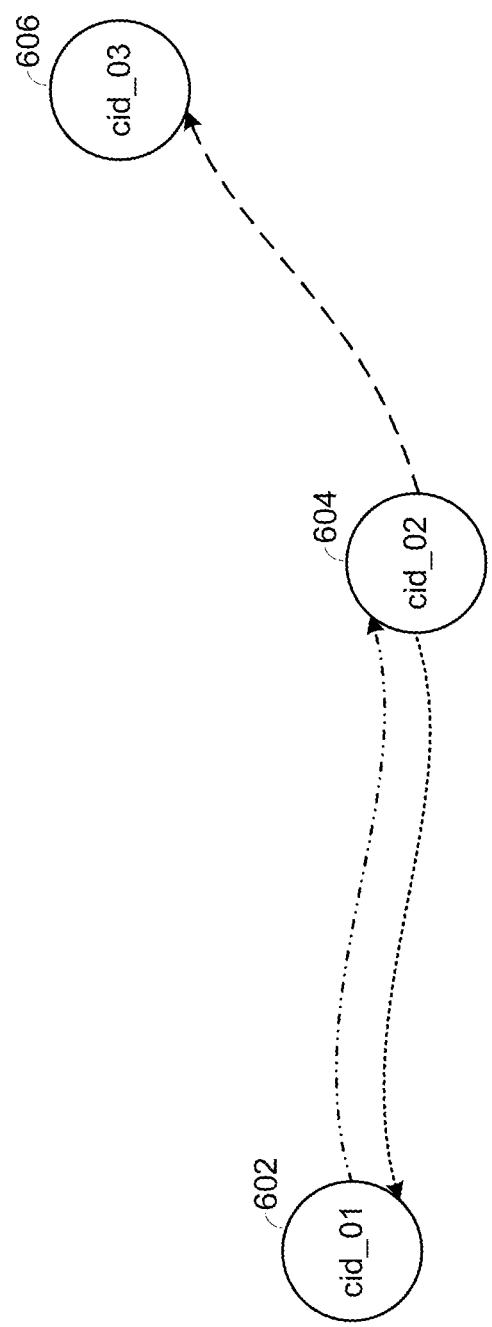
FIG. 6 illustrates an example nodal data structure, in accordance with an implementation.

FIG. 6 illustrates an example sub-graph 600, which includes or is a simplified node graph of the sub-graph 500, shown and described with reference to FIG. 5, after the data processing system collapses the nodes with the same respective customer IDs into consolidated nodes. In the sub-graph 600 the transaction edges and associated features of the intra-customers are gone. The transaction edges and associated features of the inter-customers are aggregations of corresponding account/card edges and features. For example, the transaction edge and features of a node 602-*a* node 604 can be the aggregations of the node 502—the node 510, the node 506—the node 508, and the node 506—the node 512. The sub-graph 600 can include a transaction edge between the node 604 and a node 606 representing one or more accounts for the customer ID cid_03. The transaction edge and features of the node 604—the node 602 can be the transaction edges and/or features of the node 512—the node 506, as there was only one edge along this direction in the sub-graph 500. In one example, in the sub-graph 500, the trans_amt of the node 502—the node 510 was $3000.00, the trans_amt of the node 506—the node 508 was $4000.00, and the trans_amt of the node 506—the node 512 was $5000.00. In the sub-graph 600, the transaction edge between the node 602 and the node 604 represents a transfer of $12000.00 to the node 604, which might trigger the monitoring threshold for risk management and anti-money laundering. The data processing system may not generate the same alert based on the sub-graph 500.

Figure 7B:
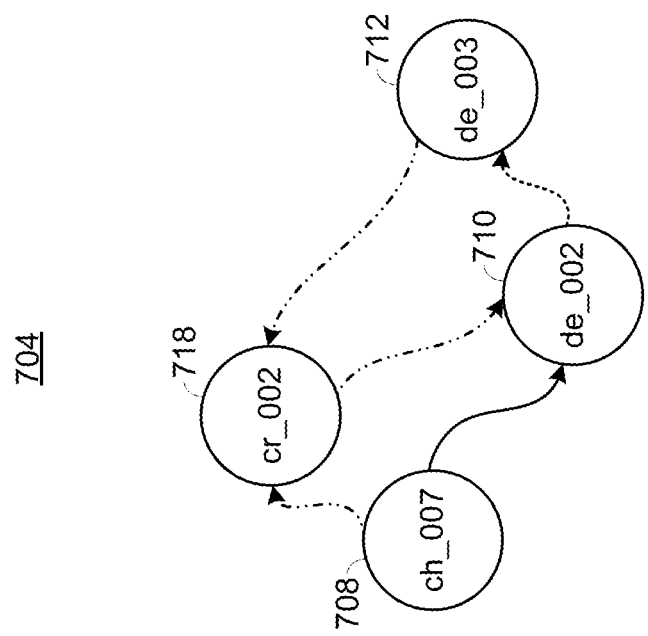
FIGS. 7A and 7B illustrate example transaction edges between nodes of a nodal data structure, in accordance with an implementation.
Figure 7A:
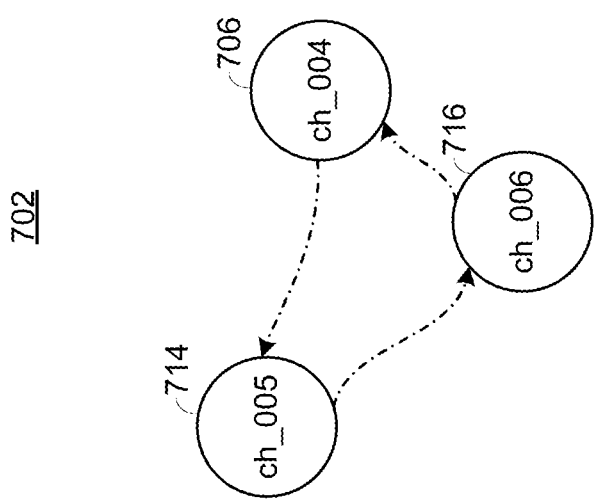
Figure 8:
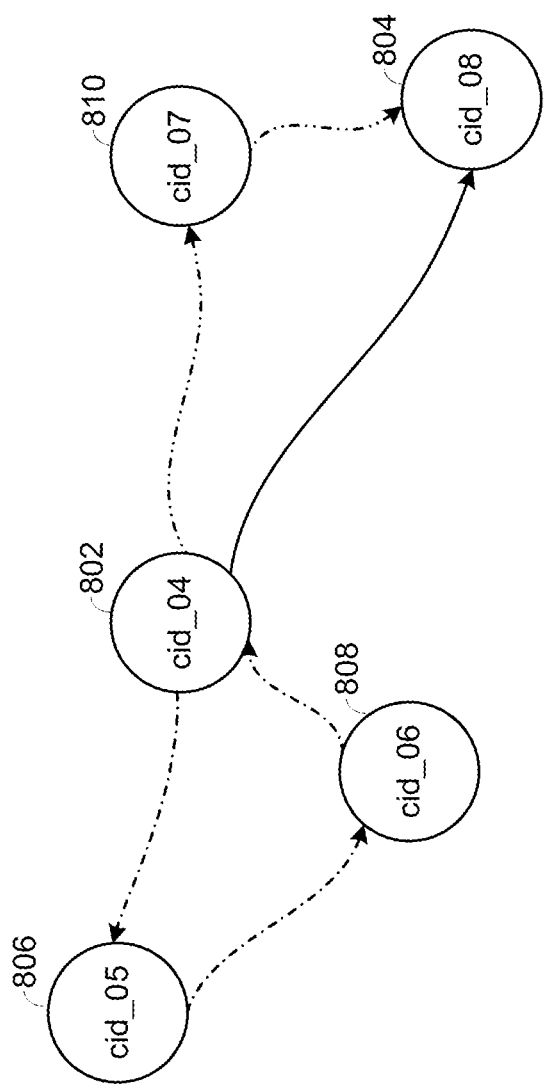
FIG. 8 illustrates an example nodal data structure, in accordance with an implementation.

Besides simplifying the graph structures, collapsing nodes can also enhance the linkage structures in some scenarios. For example, FIGS. 7A and 7B illustrate two separate sub-graphs 702 and 704. The data processing system can determine the nodes 706 and 708 correspond with the same customer (e.g., based on the nodes having the same customer ID) and collapse the two nodes 706 and 708 into a node 802 of a node graph 800, shown in FIG. 8, and determine nodes 710 and 712 correspond with the same customer and collapse the nodes 710 and 712 into a node 804 of the node graph 800. The node graph 800 may include non-collapsed nodes 806, 808, and 810 that respectfully correspond with nodes 714, 716, and 718 of the sub-graphs 702 and 704 but that are not consolidated with any nodes, such as because the nodes 714, 716, and 718 do not correspond with a common entity with any other nodes. In a linkage analysis based on monthly data, the accounts represented by the nodes 706 and 708 might not have transactions during a defined period (e.g., a month) even though they belong to the same customer ID. However, the same accounts may have had separate transactions with other accounts and credit/debit cards, which is why the data processing system may generate the sub-graphs 702 and 704 as separate sub-graphs instead of as a connected node graph. When the two sub-graphs 702 and 704 are linked together through customer IDs, the enhanced structure might provide insight to the hidden connections the sub-graphs 702 and 704 could not show. For example, the money could be moved from node 806 to 804 through the node 808 and the node 802.

Using a testing dataset of 18.8M transaction edges, the simplifying process cut down the transaction edges to 9.7M. With 48% data reduction, all relevant analysis and monitoring were significantly improved in terms of computation and labor expenses.

In some cases, an account might be shared by multiple customers and/or a credit/debit card might have more than one authorized user. For example, a husband and wife may share a checking/savings account, or a father and son may share a credit/debit card. For these types of accounts and cards, the collapsing process described above might have a setback of ambiguous customer IDs, as normally during a transaction, it may be unclear whether the primary owner or secondary owner makes payments. Due to this lack of information, it may not be straightforward to choose the representative customer ID. Accordingly, when collapsing nodes, the data processing system may only collapse nodes that have a single owner or user. The joint accounts or cards may remain in the new graph, and their label may be a concatenation of the joint owners or users. For example, if account ch_007 has two owners, cid_09 and cid_10, then the data processing system may generate a consolidated node in a new node graph with a customer ID of cid_09-10.

Figure 9:
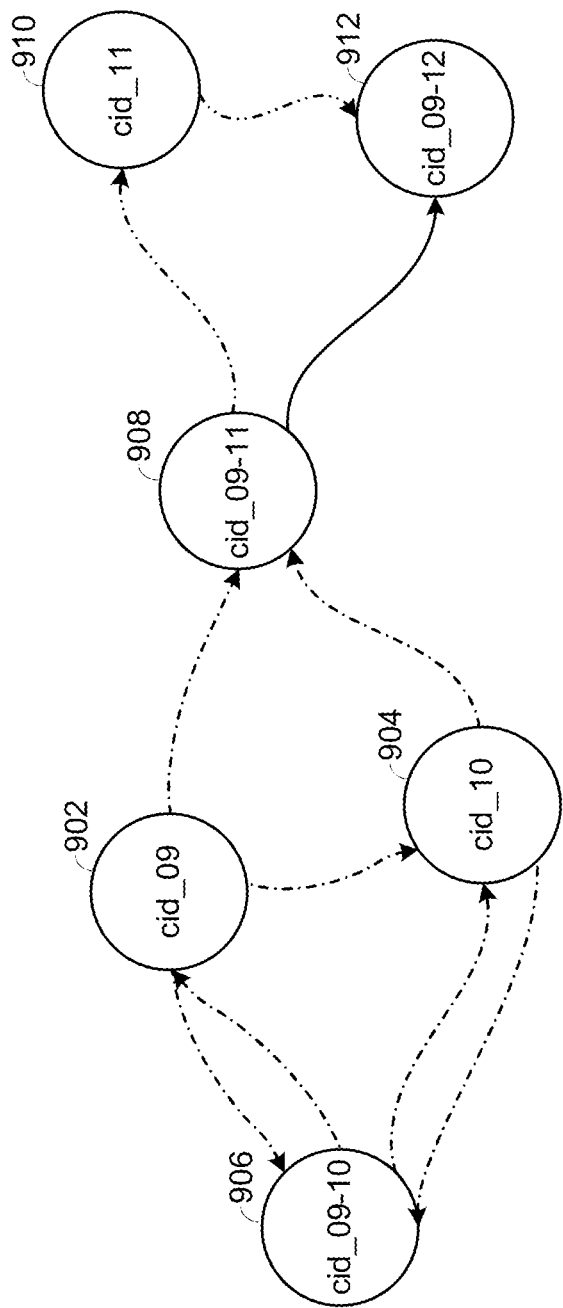
FIG. 9 illustrates an example nodal data structure, in accordance with an implementation.

FIG. 9 illustrates an example node graph 900 with nodes that represent joint accounts or cards. The node graph 900 can include nodes 902 and 904 that each contain data for a few accounts and cards that are not shared by other customer IDs. A node 906 can represents any joint accounts or cards shared by customer IDs cid_09 and cid_10. For example, if cid_09 and cid_10 share a savings account and a credit card that have transactions with the other accounts or cards of cid_09 and cid_10, the savings account and the credit card will be represented by the same node 906. The node 906 has transaction edges with its parent nodes 902 and 904 to show transaction occurrence with the other accounts or cards of their parent nodes. Note that there is a direct transaction edge between the nodes 902 and 904, as there are payments between the two nodes 902 and 904 without using the joint accounts. The customer ID cid_09 has another joint account with cid_11, so there is another joint account node 908 that indicates a joint account node between the node 902 and a node 910. The transaction amount from one customer ID to another customer ID would be the trans_amt of the corresponding node plus the joint accounts if there is any. For example, the transaction amount from the node 910 to a node 912 would be the sum of the trans_amt of the node 910—the node 912 and the joint account node 908—the node 912. Similarly, the amount from the node 902 to the node 904 would be the trans_amt of the node 902—the node 904 plus the joint account node 908—the node 904.

Figure 10:
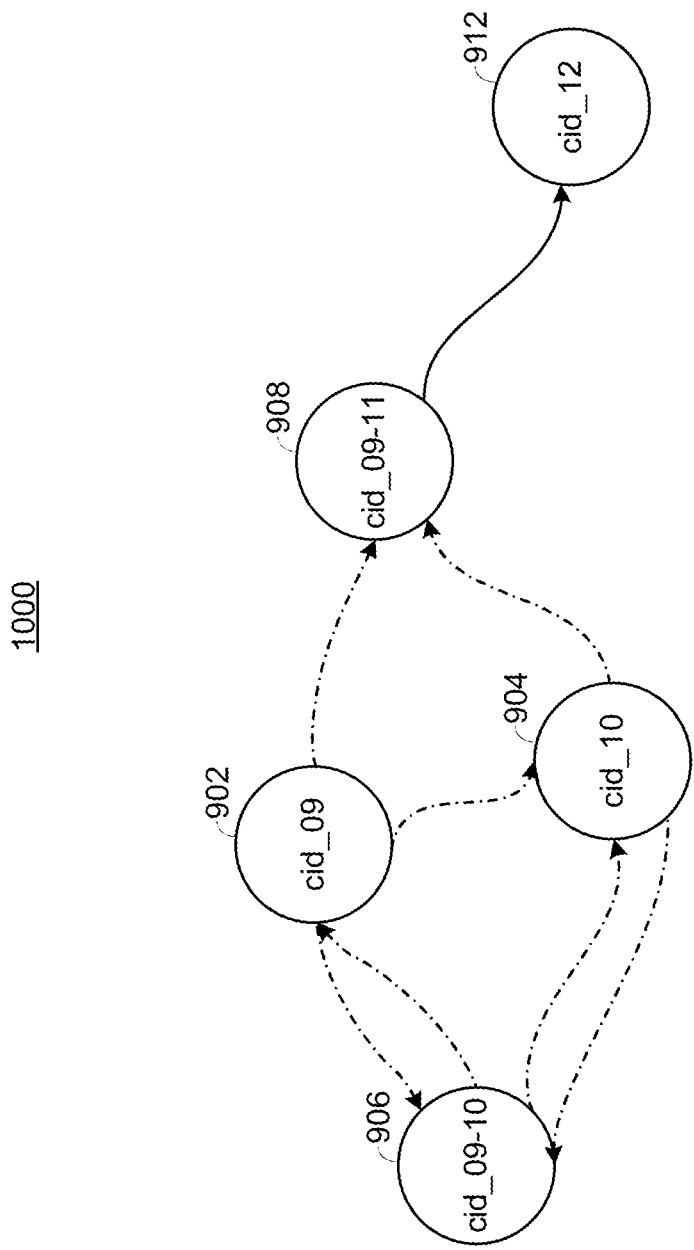
FIG. 10 illustrates an example nodal data structure, in accordance with an implementation.

In the node graph 900, both the joint account nodes link all their parent nodes together. Sometimes, the joint account nodes might only link part of their parent nodes. FIG. 10 illustrates a node graph 1000 in which the joint account node 908 only links to the node 902, as it has transactions with the other accounts or cards of the node 902. It does not have any transactions with the other accounts or cards of the node correspond 910 of the node graph 900 during the period, but it has transactions with the accounts or cards of the node 912.

In the node graph 1000, the joint account nodes are useful to depict money flow among customer IDs. Graphical analytics may be implemented based on the customer ID nodes and the joint account nodes. For example, the data processing system can apply the PageRank algorithm to the nodes of the node graph 1000 to identify any potentially influential nodes. If some joint accounts appear in the top list, then the data processing system can generate a sub-graph around the joint accounts, as shown in the two node graphs 900 and 1000. The data processing system can analyze the transaction edges and features of the joint accounts to determine a reduced set of influential candidates from all the owners or users.

Detecting Identity-Related Fraud Rings Using a Node Graph with Transaction Edges In a node graph generated as described herein, if two or more customer or joint account nodes conducted fraud transactions, they might consist of a potential financial transaction fraud ring. Fraudulent transactions could be first-party fraud or third-party fraud. First-party fraud can be conducted by an account holder, while third-party fraud can be conducted by someone else instead of the account holder. When a fraud ring suspect emerges, a data processing system (e.g., the fraud ring detection server 102) can calculate and compare the pattern, similarity, and/or relevance of the personally identifiable information (PII) of the customer nodes of the suspected fraud ring. If there is an apparent pattern, similarity, and/or relevance among the PII attributes, the fraud ring suspect might be an identity-related fraud ring, which would be an indication that the customer nodes in the ring could be based on stolen identities, synthetic identities, or a mix of both, that is worth further monitoring. The data processing system can identify other customer nodes that are in the same node graph, but not labeled as fraudulent or potentially fraudulent for further monitoring for fraudulent behavior using transaction edges of the node graph, as described below.

For example, malicious entities might create multiple identities using stolen or synthetic PII attributes, trying to apply for as many accounts as possible to maximize their criminal gains. The identities might have some PII connections or relevance by their nature. For example, the identities might share the same mailing address or email address, so that the malicious entities can access and control the billing information of the identities. Or the identities might share a stolen tax ID trying to pass the scrutiny of the account authentication department. On the other hand, the malicious entities might want to manipulate the PII attributes to create variations to deceive the authentication department. The accounts or credit cards owned by those identities likely have connected transaction activities. For example, such accounts or credit cards might repeatedly purchase goods at the same merchant if they find their suspicious checks or credit cards are accepted by the merchant or move funds to a common destination account by typical money laundering steps such as placement, layering, or integration. To identify such malicious entities, the data processing system may generate a node graph (e.g., an inter-customer transaction graph) from transaction data of the different accounts. After generating the node graph, the data processing system can determine if nodes flagged as fraudulent or for performing a fraudulent transaction have direct or indirect identity linkage or relationships using transaction edges of the node graph. The data processing system can further narrow down the involved fraud nodes as the suspects of stolen or synthetic identities for monitoring or other remediation techniques.

For example, referring again to FIG. 8, the data processing system can determine or detect a fraudulent flag (e.g., fraudulent label) in the nodes 804 and 806. The fraudulent flags could be newly updated or existing ones detected in the past few months or weeks. The data processing system can determine fraudulent nodes of the node graph that have direct or indirect connections with the nodes 804 and 806 based on PII attributes of the respective nodes, such as IP address/device ID, address, phone, email, and tax ID. For instance, the data processing system may determine the node 802 and the node 806 share the same IP address and the node 802 and the node 804 share the same phone number. Even though the node 804 and the node 806 do not have a direct PII connection or relevance, the nodes may have an indirect connection through the node 802. Based on the matches in PII between the nodes 802, 804, and 806, the data processing system may determine the accounts associated with the nodes 804 and 806 might be involved with stolen or synthetic identities. Additionally, while the node 802 might not have any suspicious activities yet, the data processing system may flag the node 802 for monitoring as fraudulent or potentially fraudulent given the node 802 operates as a bridging connection between the nodes 804 and 806.

In the stolen or synthetic ID scenarios, the PII attributes may come out with variations as the malicious entities intend to apply for multiple accounts and want the authentication department to believe that the accounts belong to different identities. For example, the node 802 and the node 804 might not have exactly the same phone number, but different phone numbers with a little bit variation. The variations could take place arbitrarily within the two phone strings. Sometimes, the phone numbers might have different ending digit such as (651) 123-5555 vs (651) 123-5558, or they might have different area code such as (651) 123-5555 vs (612) 123-5555. The data processing system may evaluate such variations using an edit distance measure, such as the Levenshtein edit distance formula. With the edit distance measure, the data processing system can determine if a pair of the phone numbers are similar to each other with a certain threshold value, where two identical phone numbers are a special case with 100% similarity.

Similarly, the other PII attributes, address, email, and tax ID could be altered by the malicious entities as well. When measuring the variations of address and email, besides the edit distance measure, the data processing system can apply the Cosine similarity, as it might have an advantage over the edit distance when dealing with the semantic similarity. An address may include a street number, street name, street type, street direction, room/suite number (if there is any), city, state, and zip code. There are many ways for the malicious entities to manipulate the address. For example, the malicious entities may change the street number, switch the position of the street direction, or edit the room/suite number inside the address string. The Cosine similarity is a good tool for the data processing system to handle the different variations and to determine if an address pair is highly relevant or similar by a certain threshold value. Sometimes, we may want to use multiple methods together to measure the similarity of some PII attributes. For example, the data processing system may use the edit distance formula to compare the digit tokens inside the address strings, while using the Cosine similarity function to compare the remaining part of the strings. The data processing system can be configured to compare the output of the edit distance formula or the Cosine similarity formula to determine matches between strings. The threshold may be specific to the types of attributes. The thresholds can be configured by an administrator input, for example.

In some embodiments, when checking the identity relationships using the different attributes (e.g., checking for matches between attributes of different nodes), the data processing system can use not only the current values but also their historical values in the different nodes. For example, a node might have a current email address, xx.yy.zz@gmail.com, and two more historical email addresses, xxxzzz@gmail.com and wwxyz@gmail.com. The three emails will be checked against the current and historical emails of the other customer nodes in the same transaction graph (e.g., the other customer nodes identified for comparing based on the other customer nodes having a direct or indirect linkage with a node flagged as fraudulent or potentially fraudulent). A customer might have frequent PII attribute updates such as address, phone, or email changes over the years. The data processing system can set up a threshold indicating the time frame from which to use values of attributes of the respective nodes' historical data. Typical options could be or include 1 year, 2 years, or 3 years.

In some embodiments, the data processing system can apply exact matches with the current and historical IP address/device ID and fuzzy matches including the edit distance and Cosine similarity with the other four attributes. The fuzzy matches are usually far more computationally expensive than the exact matches. The excessive computational expenses of applying fuzzy matches to attributes of different nodes or profiles is why generating a transaction-based node graph and identifying subsets of nodes or profiles to apply such fuzzy matching techniques provides technical advantages. Only applying the fuzzy matching and other identity matching techniques on nodes with direct and/or indirect linkages with nodes flagged as fraudulent or potentially fraudulent can substantially reduce the processing resources required to identify fraud rings.

Additionally, building the node graph can enable the data processing system to identify fraud rings that might not otherwise be detected. For instance, malicious entities may correspond with fraudulent nodes or accounts that may not have direct connections with nodes or accounts of flagged fraudulent nodes or accounts. Identifying fraud rings in this case may require identified middle nodes to build the linkages between the fraudulent accounts. Building the node graph and identifying nodes with matching attributes but with indirect connections with each other may enable the data processing system to detect such rings. This configuration is illustrated through FIG. 8, where nodes 804 and 806 may have been flagged as fraudulent and do not have direct identity linkage, but the data processing system can still link the two nodes 804 and 806 together through the node 802.

In some embodiments, joint account nodes in a node graph may not participate in the identity linkage analysis as their parent nodes do. If a joint account has current or existing fraud activities, its parents will be labeled as fraud nodes and determined if they belong to a fraud ring. For example, referring again to FIG. 8, suppose the node 810's current address is 12345 University Ave Suite A, Minneapolis MN, and the node 804 has the same address, then the nodes 804 and 810 are identity-linked. Even though the node 810 has no direct identity linkage with another fraud node 806, the data processing system may still flag the node 810 as fraudulent or potentially fraudulent. Suppose the node 808 and the node 802 are linked together through tax ID transpositions. Even though the node 808 may not have a direct link to the node 804 or the node 806, the node 808 may have an indirect link. In that case, the data processing system may identify the node 808 as fraudulent or potentially fraudulent. Accordingly, given a node graph, any non-fraudulent nodes (e.g., nodes that have not been flagged as fraudulent) with direct or indirect identity linkage with nodes flagged as fraudulent may be flagged as fraudulent and/or have higher monitoring weight than those that are in the same node graph but do not have any direct or indirect identity linkage with fraud ring nodes. By combining the node graph and identity linkage analysis together, the data processing system may not only determine synthetic or stolen identity-related malicious entities, but also prevent potential credit or cash losses for the business by monitoring relevant customers.

Overall, by implementing the systems and methods described herein, a data processing system can reduce the processing resources required and/or improve the accuracy of fraud ring detection using a nodal data structure. To do so, the data processing may first integrate account and credit/debit card transactions together from different channels to generate a node graph with nodes representing the different accounts and/or cards with transaction edges indicating transactions between the accounts represented by the nodes. Next, the data processing system may collapse the account and card nodes into its respective customer nodes, except for those that are shared or owned by multiple people. In doing so, the data processing system may generate a new node graph with nodes representing customers with transaction edges indicating transactions between the customers. The new node graph can have a simplified structure by getting rid of the complex intra-customer transactions and lifts the linkage edges to the inter-customer level, which can reduce the process resources that are required to analyze the node graph.

The data processing system can use the node graph to determine identity-related fraud rings, such as synthetic or stolen identity frauds. For example, fraud rings of synthetic or stolen identities might intend to purchase goods at the same merchant or move funds to the same destination account, they could be included in a transaction graph. The fraud rings of the synthetic or stolen identities might have some PII connections or relevance by their nature. The data processing system can identify such fraud rings by applying identity linkage analysis on the node graph to determine potential synthetic or stolen identity cases after a transaction graph is generated. The transaction graph could make the identity linkage analysis more efficient by controlling the size of the relevant customers. The node graph can also build linkages between fraudulent nodes through the third nodes (e.g., generate indirect linkages). When applying identity linkage analysis, to be resilient to the malicious entity's manipulations on the synthetic or stolen identities, the data processing system can use fuzzy matching techniques to allow a certain degree of the variations of the PII attributes. The data processing system can also monitor related customer nodes in the same graph even though they don't have any known fraud activities yet to proactively detect fraudulent behavior.

In one aspect, the present disclosure describes a system. The system can include one or more processors configured by machine-readable instructions stored in memory, wherein, upon execution, the machine-readable instructions cause the one or more processors to: generate a node graph comprising a plurality of nodes each representing a different entity and linked with one or more other nodes of the plurality of nodes with transaction edges based on one or more transactions between the entity and entities the one or more other nodes represent; determine a first node of the plurality of nodes of the node graph comprises a fraudulent flag indicating a first entity of the first node facilitated a fraudulent transaction; responsive to the determination that the first node comprises a fraudulent flag, identify a set of nodes of the plurality of nodes of the node graph responsive to each node of the set of nodes having a direct transaction edge connection with the first node within the node graph or an indirect transaction edge connection with the first node via at least one node directly connected with the first node; determine, according to a matching policy, whether any of the set of nodes comprise one or more second field-value pairs matching one or more first field-value pairs of the first node; generate, based on the determination according to the matching policy, the fraudulent flag in a subset of the set of nodes responsive to determining each node in the subset satisfies the matching policy; and generate a record comprising identifications of the first node and each node of the subset of nodes.

In another aspect, the present disclosure describes a method. The method can include generating, by one or more processors, a node graph comprising a plurality of nodes each representing a different entity and linked with one or more other nodes of the plurality of nodes with transaction edges based on one or more transactions between the entity and entities the one or more other nodes represent; determining, by one or more processors, a first node of the plurality of nodes of the node graph comprises a fraudulent flag indicating a first entity of the first node facilitated a fraudulent transaction; responsive to the determination that the first node comprises a fraudulent flag, identifying, by the one or more processors, a set of nodes of the plurality of nodes of the node graph responsive to each node of the set of nodes having a direct transaction edge connection with the first node within the node graph or an indirect transaction edge connection with the first node via at least one node directly connected with the first node; determining, by the one or more processors and according to a matching policy, whether any of the set of nodes comprise one or more second field-value pairs matching one or more first field-value pairs of the first node; generating, by the one or more processors and based on the determination according to the matching policy, the fraudulent flag in a subset of the set of nodes responsive to determining each node in the subset satisfies the matching policy; and generating, by the one or more processors, a record comprising identifications of the first node and each node of the subset of nodes.

In another aspect, the present disclosure describes on-transitory computer-readable media comprising instructions that, when executed by one or more processors, cause the one or more processors to generate a node graph comprising a plurality of nodes each representing a different entity and linked with one or more other nodes of the plurality of nodes with transaction edges based on one or more transactions between the entity and entities the one or more other nodes represent; determine a first node of the plurality of nodes of the node graph comprises a fraudulent flag indicating a first entity of the first node facilitated a fraudulent transaction; responsive to the determination that the first node comprises a fraudulent flag, identify a set of nodes of the plurality of nodes of the node graph responsive to each node of the set of nodes having a direct transaction edge connection with the first node within the node graph or an indirect transaction edge connection with the first node via at least one node directly connected with the first node; determine, according to a matching policy, whether any of the set of nodes comprise one or more second field-value pairs matching one or more first field-value pairs of the first node; generate, based on the determination according to the matching policy, the fraudulent flag in a subset of the set of nodes responsive to determining each node in the subset satisfies the matching policy; and generate a record comprising identifications of the first node and each node of the subset of nodes.

Large Language Models and Generative Artificial Intelligence

Large language models can be used to implement or enhance aspects described herein. As discussed above, replays, logs, or other data of user interactions with the digital experience can be captured. Such data can be provided as input to a large language model with a prompt to summarize what occurred. Such a summary can be provided as part of the remediation (e.g., to developers to better understand the problem). Further, the large language model can be prompted to identify designs or other changes that may be implemented to address the struggle. In addition to or instead of designs, the large language model may be configured to (e.g., with appropriate prompts and contacts) generate code or instructions (or changes to code or instructions) that address the struggle. A large language model may be used to generate user-specific and struggle-specific messages to the user (e.g., in relation to the above communications).

Computing Environment

Figure 11:
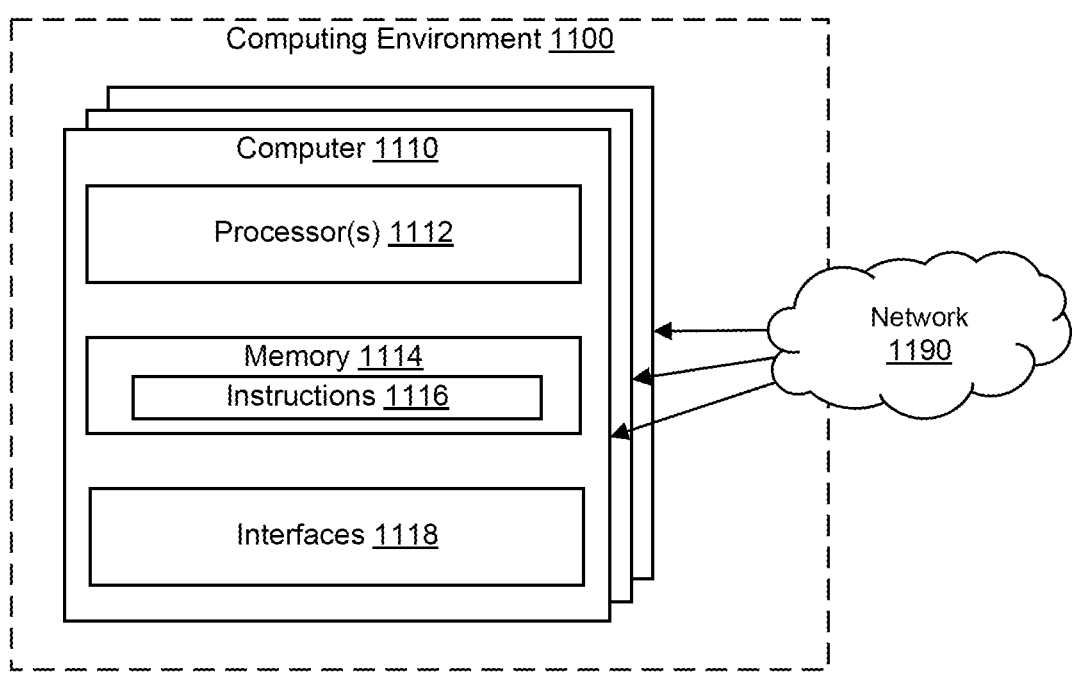
FIG. 11 discloses a computing environment in which aspects of the present disclosure may be implemented, in accordance with an implementation.

FIG. 11 discloses a computing environment 1100 in which aspects of the present disclosure may be implemented. A computing environment 1100 is a set of one or more virtual or physical computers 1110 that individually or in cooperation achieve tasks, such as implementing one or more aspects described herein. The computers 1110 have components that cooperate to cause output based on input. Example computers 1110 include desktops, servers, mobile devices (e.g., smart phones and laptops), payment terminals, wearables, virtual/augmented/expanded reality devices, spatial computing devices, virtualized devices, other computers, or combinations thereof. In particular example implementations, the computing environment 1100 includes at least one physical computer.

The computing environment 1100 may specifically be used to implement one or more aspects described herein. In some examples, one or more of the computers 1110 may be implemented as a user device, such as a mobile device, and others of the computers 1110 may be used to implement aspects of a machine learning framework useable to train and deploy models exposed to the mobile device or provide other functionality, such as through exposed application programming interfaces.

The computing environment 1100 can be arranged in any of a variety of ways. The computers 1110 can be local to or remote from other computers 1110 of the environment 1100. The computing environment 1100 can include computers 1110 arranged according to client-server models, peer-to-peer models, edge computing models, other models, or combinations thereof.

In many examples, the computers 1110 are communicatively coupled with devices internal or external to the computing environment 1100 via a network 1190. The network 1190 is a set of devices that facilitate communication from a sender to a destination, such as by implementing communication protocols. Example networks 1190 include local area networks, wide area networks, intranets, or the Internet.

In some implementations, computers 1110 can be general-purpose computing devices (e.g., consumer computing devices). In some instances, via hardware or software configuration, computers 1110 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 1110 include one or more processors 1112, memory 1114, and one or more interfaces 1118. Such components can be virtual, physical, or combinations thereof.

The one or more processors 1112 are components that execute instructions, such as instructions that obtain data, process the data, and provide output based on the processing. The one or more processors 1112 often obtain instructions and data stored in the memory 1114. The one or more processors 1112 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1112 include at least one physical processor implemented as an electrical circuit. Example providers processors 1112 include INTEL, AMD, QUALCOMM, TEXAS INSTRUMENTS, and APPLE.

The memory 1114 is a collection of components configured to store instructions 1116 and data for later retrieval and use. The instructions 1116 can, when executed by the one or more processors 1112, cause execution of one or more operations that implement aspects described herein. In many examples, the memory 1114 is a non-transitory computer-readable medium, such as random access memory, read only memory, cache memory, registers, portable memory (e.g., enclosed drives or optical disks), mass storage devices, hard drives, solid state drives, other kinds of memory, or combinations thereof. In certain circumstances, transitory memory 1114 can store information encoded in transient signals.

The one or more interfaces 1118 are components that facilitate receiving input from and providing output to something external to the computer 1110, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors, such as those using the Global Positioning System), other input components, or combinations thereof (e.g., a touch sensitive display). The one or more interfaces 1118 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as WI-FI, cellular, BLUETOOTH, ZIGBEE, or other protocols). One or more of the one or more interfaces 1118 can facilitate connection of the computing environment 1100 to a network 1190.

The computers 1110 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 12:
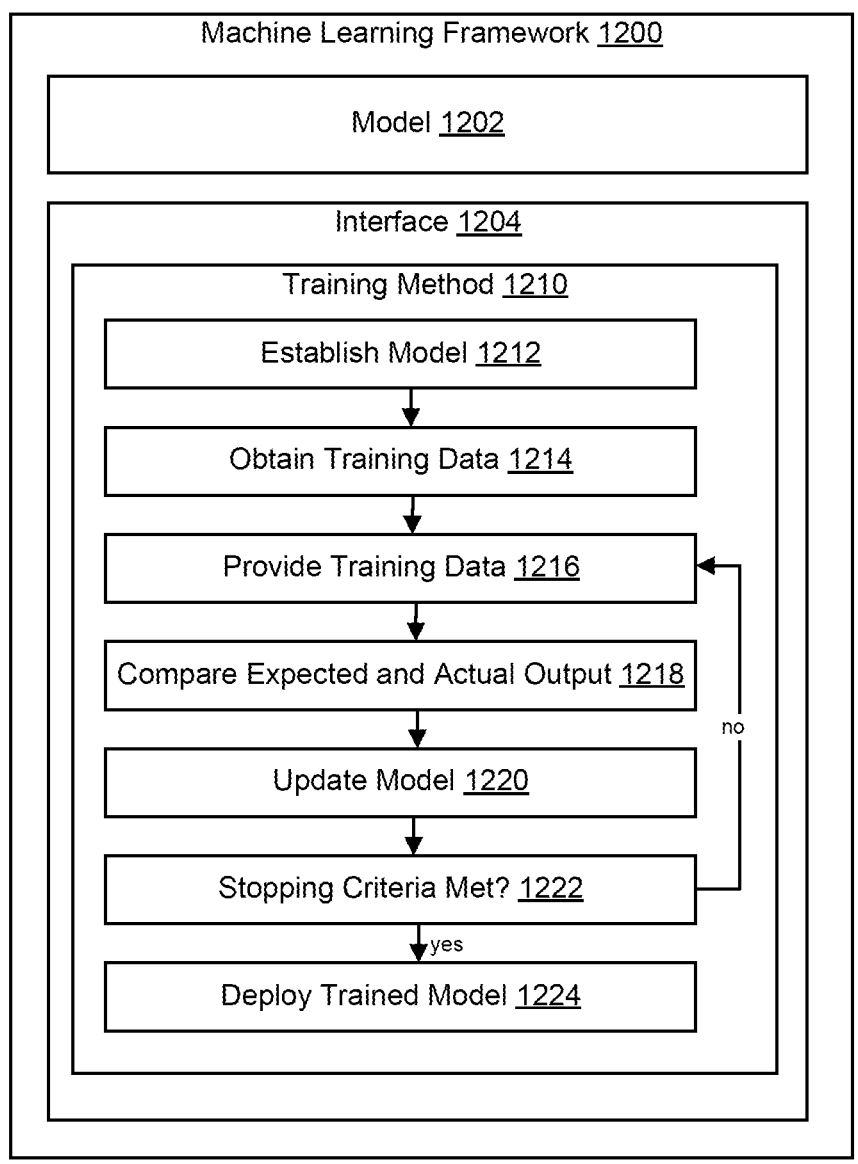

FIG. 12 illustrates an example machine learning framework 1200 that techniques described herein may benefit from. A machine learning framework 1200 is a collection of software and data that implements artificial intelligence trained to provide output, such as predictive data, based on input. Examples of artificial intelligence that can be implemented with machine learning ways include neural networks (including recurrent neural networks), language models (including so-called "large language models"), generative models, natural language processing models, adversarial networks, decision trees, Markov models, support vector machines, genetic algorithms, others, or combinations thereof. A person of skill in the art, having the benefit of this disclosure, will understand that these artificial intelligence implementations need not be equivalent to each other and may instead select from among them based on the context in which they will be used. Machine learning frameworks 1200 or components thereof are often built or refined from existing frameworks, such as TENSORFLOW by GOOGLE, INC. or PYTORCH by the PYTORCH community.

The machine learning framework 1200 can include one or more models 1202 that are the structured representation of learning and an interface 1204 that supports use of the model 1202.

The model 1202 can take any of a variety of forms. In many examples, the model 1202 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 1202 can include a representation of memory (e.g., providing long short-term memory functionality). Where the set includes more than one model 1202, the models 1202 can be linked, cooperate, or compete to provide output.

The interface 1204 can include software procedures (e.g., defined in a library) that facilitate the use of the model 1202, such as by providing a way to establish and interact with the model 1202. For instance, the software procedures can include software for receiving input, preparing input for use (e.g., by performing vector embedding, such as using Word2Vec, BERT, or another technique), processing the input with the model 1202, providing output, training the model 1202, performing inference with the model 1202, fine tuning the model 1202, other procedures, or combinations thereof.

In an example implementation, interface 1204 can be used to facilitate a training method 1210 that can include operation 1212. Operation 1212 includes establishing a model 1202, such as initializing a model 1202. The establishing can include setting up the model 1202 for further use (e.g., by training or fine tuning). The model 1202 can be initialized with values. In examples, the model 1202 can be pretrained. Operation 1214 can follow operation 1212. Operation 1214 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 1202. Operation 1216 can follow operation 1214. Operation 1216 includes providing a portion of the training data to the model 1202. This can include providing the training data in a format usable by the model 1202. The framework 1200 (e.g., via the interface 1204) can cause the model 1202 to produce an output based on the input. Operation 1218 can follow operation 1216. Operation 1218 includes comparing the expected output with the actual output. In an example, this can include applying a loss function to determine the difference between expected and actual. This value can be used to determine how training is progressing. Operation 1220 can follow operation 1218. Operation 1220 includes updating the model 1202 based on the result of the comparison. This can take any of a variety of forms depending on the nature of the model 1202. Where the model 1202 includes weights, the weights can be modified to increase the likelihood that the model 1202 will produce correct output given an input. Depending on the model 1202, backpropagation or other techniques can be used to update the model 1202. Operation 1222 can follow operation 1220. Operation 1222 includes determining whether a stopping criterion has been reached, such as based on the output of the loss function (e.g., actual value or change in value over time). In addition to, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1214. If the stopping criterion has been satisfied, the flow can move to operation 1222. Operation 1222 includes deploying the trained model 1202 for use in production, such as providing the trained model 1202 with real-world input data and produce output data used in a real-world process. The model 1202 can be stored in memory 1114 of at least one computer 1110, or distributed across memories of two or more such computers 1110 for production of output data (e.g., predictive data).

APPLICATION OF TECHNIQUES

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for, and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system comprising:
   one or more processors configured by machine-readable instructions stored in memory, wherein, upon execution, the machine-readable instructions cause the one or more processors to:
   generate a node graph comprising a plurality of nodes each representing a different entity and linked with one or more other nodes of the plurality of nodes with transaction edges based on one or more transactions between the entity and entities the one or more other nodes represent;
   determine a first node of the plurality of nodes of the node graph comprises a fraudulent flag indicating a first entity of the first node facilitated a fraudulent transaction;
   responsive to the determination that the first node comprises a fraudulent flag, identify a set of nodes of the plurality of nodes of the node graph responsive to each node of the set of nodes having a direct transaction edge connection with the first node within the node graph or an indirect transaction edge connection with the first node via at least one node directly connected with the first node;
   determine, according to a matching policy, whether any of the set of nodes comprise one or more second field-value pairs matching one or more first field-value pairs of the first node, wherein the matching policy is applied on personal identifiable information (PII) attributes, wherein the matching policy applies both an edit distance measure and a Cosine similarity function to different components of a single PII attribute for fuzzy matching, wherein the edit distance measure is applied to digit tokens within address strings and the Cosine similarity function is applied to remaining non-digit portions of the address strings, wherein the edit distance measure calculates the minimum number of single-character edits required to change one string into another string and is applied with a threshold value to determine if a pair of digit tokens are similar to each other, and wherein the Cosine similarity function is applied with a threshold value to determine if a pair of non-digit portions having multiple address components are similar to each other;
   generate, based on the determination according to the matching policy, the fraudulent flag in a subset of the set of nodes responsive to determining each node in the subset satisfies the matching policy; and
   generate a record comprising identifications of the first node and each node of the subset of nodes.

2. The system of claim 1, wherein the machine-readable instructions cause the one or more processors to generate the node graph by:
   generating a plurality of account nodes in the node graph, each account node corresponding to a different account;
   determining one or more respective pairs of the plurality of account nodes that correspond to a common entity within the respective pairs; and
   separately collapsing each of the one or more respective pairs of the plurality of account nodes into a respective single consolidated node responsive to determining the respective pairs of the plurality of account nodes corresponds to a common entity.

3. The system of claim 2, wherein the machine-readable instructions cause the one or more processors to collapse a pair of the one or more respective pairs of the plurality of account nodes into a single consolidated node based on each of the account nodes of the pair comprising an identical customer number.

4. The system of claim 2, wherein the machine-readable instructions cause the one or more processors to collapse a pair of the one or more respective pairs of the plurality of account nodes into a single consolidated node responsive to transaction edges between the pair of nodes satisfying a criterion.

5. The system of claim 4, wherein the machine-readable instructions cause the one or more processors to determine the transaction edges between the pair of nodes satisfy the criterion based on each of the account nodes of the respective pair of nodes comprising an identical customer identifier.

6. The system of claim 2, wherein the machine-readable instructions cause the one or more processors to collapse a pair of the one or more respective pairs of the plurality of account nodes into a single consolidated node by:
   removing each node of the pair of nodes and any transaction edges between the pair of nodes from the node graph;
   generating a single consolidated node in the node graph based on field-value pairs within the pair of nodes; and
   replacing any transaction edges between the pair nodes and other nodes of the node graph with transaction edges connecting the consolidated node and the other nodes of the node graph.

7. The system of claim 1, wherein the machine-readable instructions cause the one or more processors to:
   receive an indication of the fraudulent transaction a user input at a user interface; and
   add the fraudulent flag indicating the first entity of the first node facilitated the fraudulent transaction to the first node based on receipt of the indication.

8. The system of claim 7, wherein the machine-readable instructions cause the one or more processors to determine the first node of the plurality of nodes of the node graph based on receipt of the indication.

9. The system of claim 1, wherein the machine-readable instructions cause the one or more processors to:
   determine the first entity of the first node facilitated the fraudulent transaction based on a transaction pattern indicated in transaction edges connecting the first node to one or more other nodes of the node graph; and
   add the fraudulent flag indicating the first entity of the first node facilitated the fraudulent transaction to the first node based on determination that the first entity of the first node facilitated the fraudulent transaction.

10. The system of claim 1, wherein the machine-readable instructions cause the one or more processors to determine whether any of the set of nodes comprise one or more second field-value pairs matching one or more first field-value pairs of the first node by using an edit distance function or a Cosine similarity function on field-value pairs of the same type between the one or more second field-value pairs of the set of nodes and the one or more first field-value pairs of the first node.

11. The system of claim 1, wherein the machine-readable instructions cause the one or more processors to determine whether any of the set of nodes comprise one or more second field-value pairs matching one or more first field-value pairs of the first node by comparing one or more Internet Protocol (IP) address field-value pair, address field-value pair, phone number field-value pair, email field-value pair, or tax identification field-value pair.

12. The system of claim 1, wherein the machine-readable instructions cause the one or more processors to determine whether any of the set of nodes comprise one or more second field-value pairs matching one or more first field-value pairs of the first node by comparing one or more historical field-value pairs of the first node and the set of nodes.

13. The system of claim 1, wherein the machine-readable instructions cause the one or more processors to:
   transmit the record comprising identifications of the first node and each node of the subset of nodes to a monitoring system configured to monitor transactions performed by the subset of nodes,
   wherein receipt of the record causes the monitoring system to monitor transactions performed by the subset of nodes.

14. The system of claim 13, wherein the monitoring system monitors the transactions performed by the subset of nodes by automatically monitoring transaction edges generated for the subset of nodes over time against a fraud detection policy.

15. A method comprising:
   generating, by one or more processors, a node graph comprising a plurality of nodes each representing a different entity and linked with one or more other nodes of the plurality of nodes with transaction edges based on one or more transactions between the entity and entities the one or more other nodes represent;
   determining, by one or more processors, a first node of the plurality of nodes of the node graph comprises a fraudulent flag indicating a first entity of the first node facilitated a fraudulent transaction;
   responsive to the determination that the first node comprises a fraudulent flag, identifying, by the one or more processors, a set of nodes of the plurality of nodes of the node graph responsive to each node of the set of nodes having a direct transaction edge connection with the first node within the node graph or an indirect transaction edge connection with the first node via at least one node directly connected with the first node;
   determining, by the one or more processors and according to a matching policy, whether any of the set of nodes comprise one or more second field-value pairs matching one or more first field-value pairs of the first node, wherein the matching policy is applied on personal identifiable information (PII) attributes, wherein the matching policy applies both an edit distance measure and a Cosine similarity function to different components of a single PII attribute for fuzzy matching, wherein the edit distance measure is applied to digit tokens within address strings and the Cosine similarity function is applied to remaining non-digit portions of the address strings, wherein the edit distance measure calculates the minimum number of single-character edits required to change one string into another string and is applied with a threshold value to determine if a pair of digit tokens are similar to each other, and wherein the Cosine similarity function is applied with a threshold value to determine if a pair of non-digit portions having multiple address components are similar to each other;
   generating, by the one or more processors and based on the determination according to the matching policy, the fraudulent flag in a subset of the set of nodes responsive to determining each node in the subset satisfies the matching policy; and
   generating, by the one or more processors, a record comprising identifications of the first node and each node of the subset of nodes.

16. The method of claim 15, wherein generating the node graph comprises:
   generating, by the one or more processors, a plurality of account nodes in the node graph, each account node corresponding to a different account;
   determining, by the one or more processors, one or more respective pairs of the plurality of account nodes that correspond to a common entity within the respective pairs; and
   separately collapsing, by the one or more processors, each of the one or more respective pairs of the plurality of account nodes into a respective single consolidated node responsive to determining the respective pairs of the plurality of account nodes corresponds to a common entity.

17. The method of claim 16, comprising collapsing, by the one or more processors, a pair of the one or more respective pairs of the plurality of account nodes into a single consolidated node based on each of the account nodes of the pair comprising an identical customer number.

18. Non-transitory computer-readable media comprising instructions that, when executed by one or more processors, cause the one or more processors to:
   generate a node graph comprising a plurality of nodes each representing a different entity and linked with one or more other nodes of the plurality of nodes with transaction edges based on one or more transactions between the entity and entities the one or more other nodes represent;
   determine a first node of the plurality of nodes of the node graph comprises a fraudulent flag indicating a first entity of the first node facilitated a fraudulent transaction;
   responsive to the determination that the first node comprises a fraudulent flag, identify a set of nodes of the plurality of nodes of the node graph responsive to each node of the set of nodes having a direct transaction edge connection with the first node within the node graph or an indirect transaction edge connection with the first node via at least one node directly connected with the first node;
   determine, according to a matching policy, whether any of the set of nodes comprise one or more second field-value pairs matching one or more first field-value pairs of the first node;
   generate, based on the determination according to the matching policy, the fraudulent flag in a subset of the set of nodes responsive to determining each node in the subset satisfies the matching policy, wherein the matching policy is applied on personal identifiable information (PII) attributes, wherein the matching policy applies both an edit distance measure and a Cosine similarity function to different components of a single PII attribute for fuzzy matching, wherein the edit distance measure is applied to digit tokens within address strings and the Cosine similarity function is applied to remaining non-digit portions of the address strings, wherein the edit distance measure calculates the minimum number of single-character edits required to change one string into another string and is applied with a threshold value to determine if a pair of digit tokens are similar to each other, and wherein the Cosine similarity function is applied with a threshold value to determine if a pair of non-digit portions having multiple address components are similar to each other; and generate a record comprising identifications of the first node and each node of the subset of nodes.

19. The non-transitory computer-readable media of claim 18, wherein the instructions cause the one or more processors to generate the node graph by:

generating a plurality of account nodes in the node graph, each account node corresponding to a different account;

determining one or more respective pairs of the plurality of account nodes that correspond to a common entity within the respective pairs; and separately collapsing each of the one or more respective pairs of the plurality of account nodes into a respective single consolidated node responsive to determining the respective pairs of the plurality of account nodes corresponds to a common entity.

20. The non-transitory computer-readable media of claim 19, wherein the instructions cause the one or more processors to collapse a pair of the one or more respective pairs of the plurality of account nodes into a single consolidated node based on each of the account nodes of the pair comprising an identical customer number.

* * * * *